United States Patent [19]

Briggs

[11] Patent Number: 5,501,222
[45] Date of Patent: Mar. 26, 1996

[54] SYSTEM FOR IMAGING A REGION

[76] Inventor: Keith A. Briggs, 430 Navaro Pl. #107, San Jose, Calif. 95134

[21] Appl. No.: 242,536

[22] Filed: May 13, 1994

[51] Int. Cl.$^6$ ............................................ A61B 8/00
[52] U.S. Cl. ........................................ 128/661.07; 73/624
[58] Field of Search ........................... 128/653.1, 661.07, 128/661.08, 661.09, 661.10, 662.01, 662.04; 73/624, 627, 628, 629, 632, 861.25; 340/572, 554

[56] References Cited

U.S. PATENT DOCUMENTS

| | | |
|---|---|---|
| 4,209,853 | 6/1980 | Hyatt . |
| 4,324,140 | 4/1982 | Auld . |
| 4,330,874 | 5/1982 | Sorwick . |
| 4,434,658 | 3/1984 | Miyazaki et al. . |
| 4,437,348 | 3/1984 | Sasaki . |
| 4,463,608 | 8/1984 | Takeuchi et al. . |
| 4,541,436 | 9/1985 | Hassler et al. . |
| 4,550,607 | 11/1985 | Maslak et al. . |
| 4,595,915 | 6/1986 | Close ............................ 340/572 |
| 4,596,145 | 6/1986 | Smith et al. . |
| 4,597,292 | 7/1986 | Fujii et al. . |
| 4,699,009 | 10/1987 | Maslak et al. . |
| 4,841,489 | 6/1989 | Ozaki et al. . |
| 4,926,868 | 5/1990 | Larsen ............................ 128/653.1 |
| 5,014,710 | 5/1991 | Maslak et al. . |
| 5,070,734 | 12/1991 | Kawabuchi et al. . |
| 5,070,879 | 12/1991 | Herres . |
| 5,090,412 | 2/1992 | Shimazaki . |
| 5,097,709 | 3/1992 | Masuzawa et al. . |
| 5,111,695 | 5/1992 | Engeler et al. . |
| 5,128,903 | 7/1992 | Hassler et al. . |
| 5,129,399 | 7/1992 | Hirama . |
| 5,159,931 | 11/1992 | Pini . |
| 5,211,059 | 5/1993 | Hayakawa et al. . |
| 5,235,857 | 8/1993 | Anderson . |
| 5,237,542 | 8/1993 | Burke et al. . |

OTHER PUBLICATIONS

"Sar Theory From Doppler Point Of View," Synthetic Aperture Radar, pp. 203–216.

*Primary Examiner*—George Manuel
*Attorney, Agent, or Firm*—Majestic, Parsons, Siebert & Hsue

[57] ABSTRACT

A transmitter transmits ultrasound signals towards a region to be imaged. The reflected ultrasound signals from the region are detected by a receiver. The transmitter and/or receiver is or are moved relative to the region to create Doppler phase shift. The time compression/expansion caused by the Doppler phase shift is dewarped by filtering in order to recover the amplitudes of the ultrasound signals reflected from different portions of the region for imaging.

56 Claims, 17 Drawing Sheets

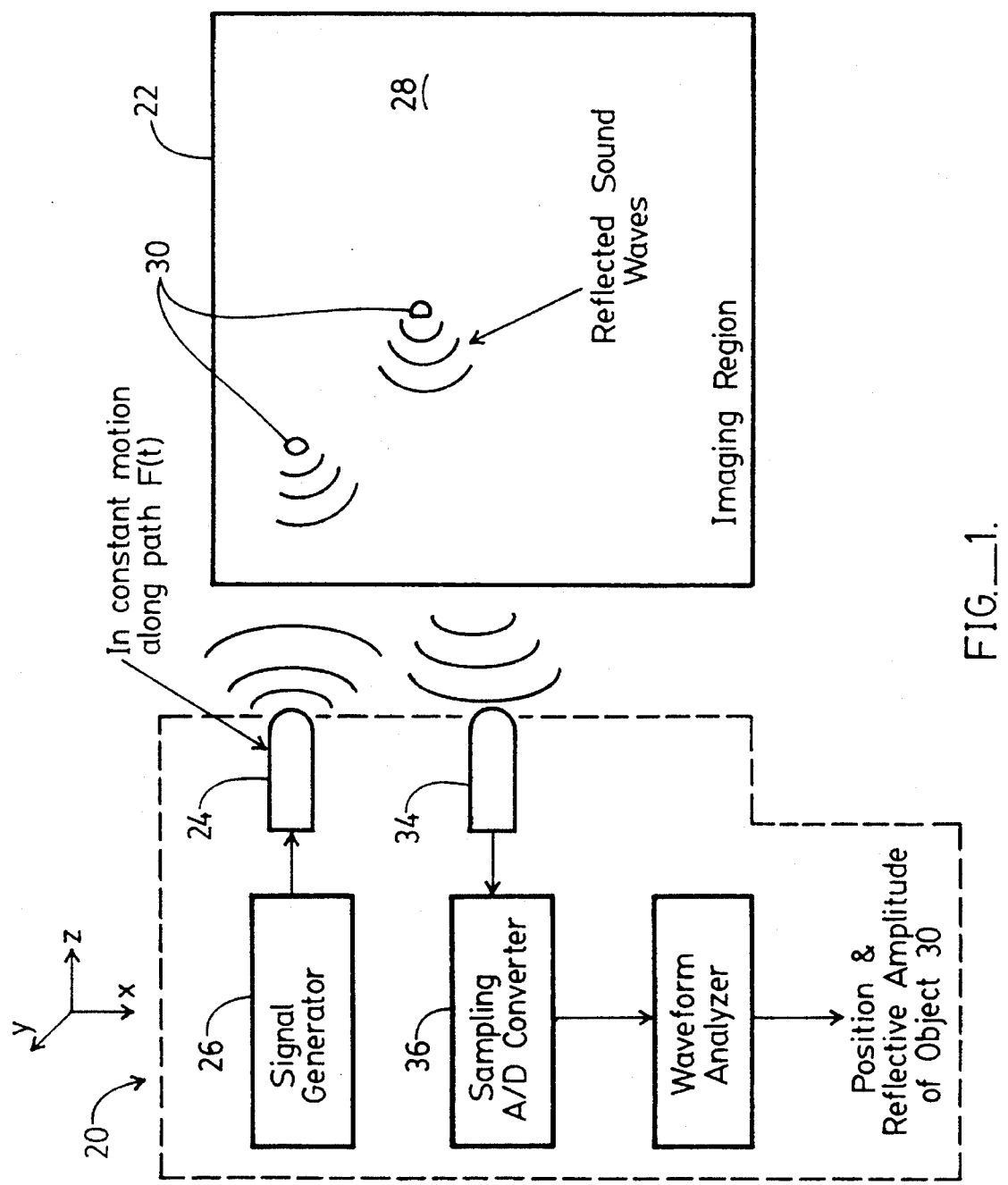
FIG._1.

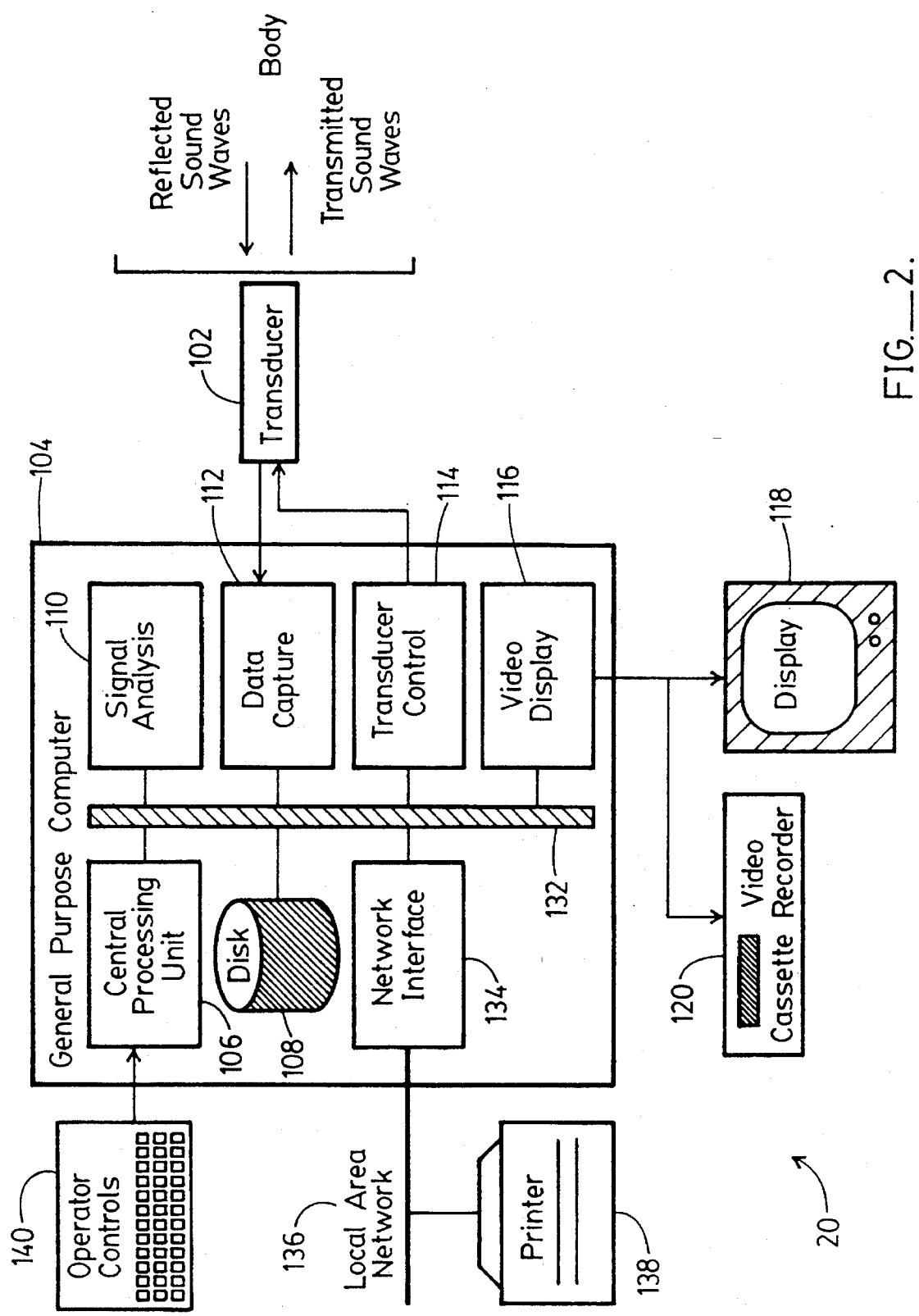
FIG._2.

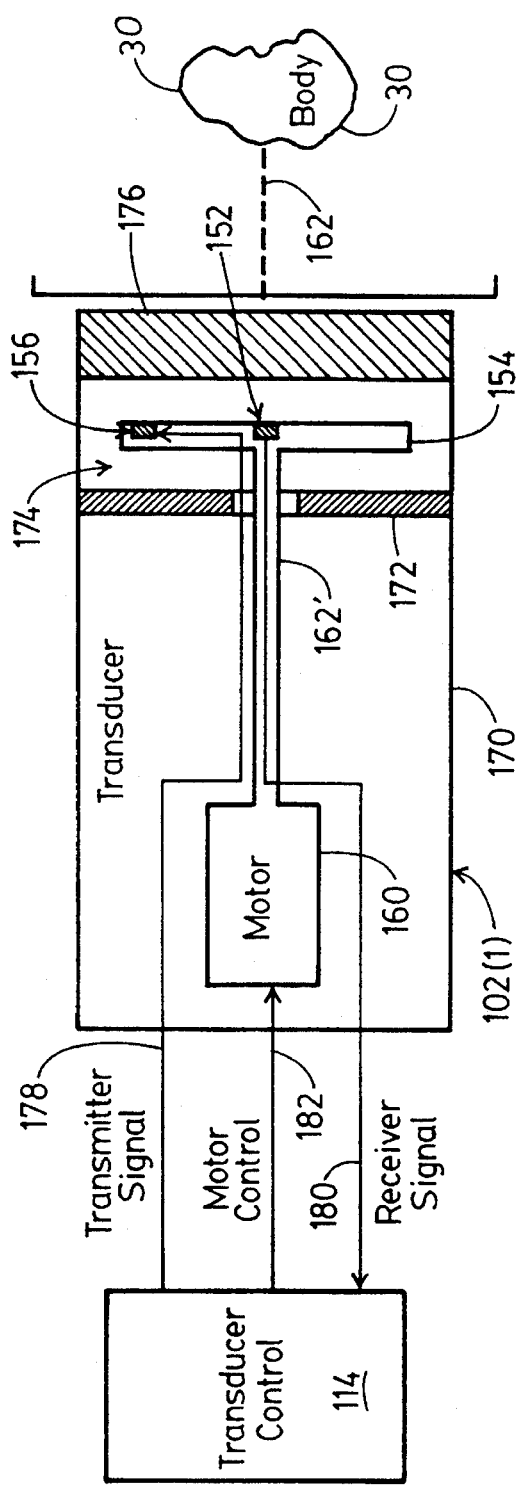
FIG._3A.
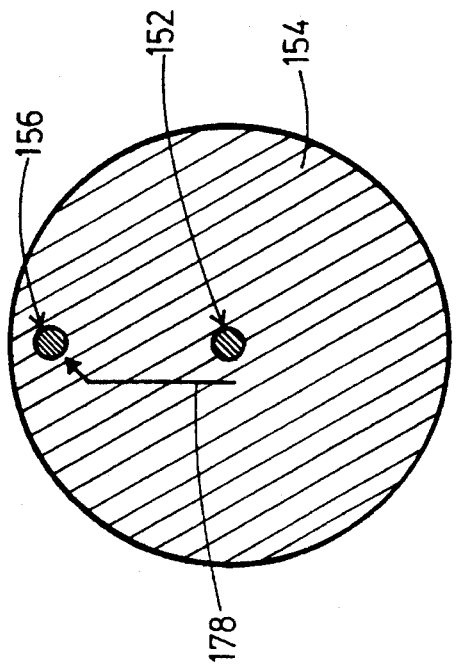
FIG._3B.

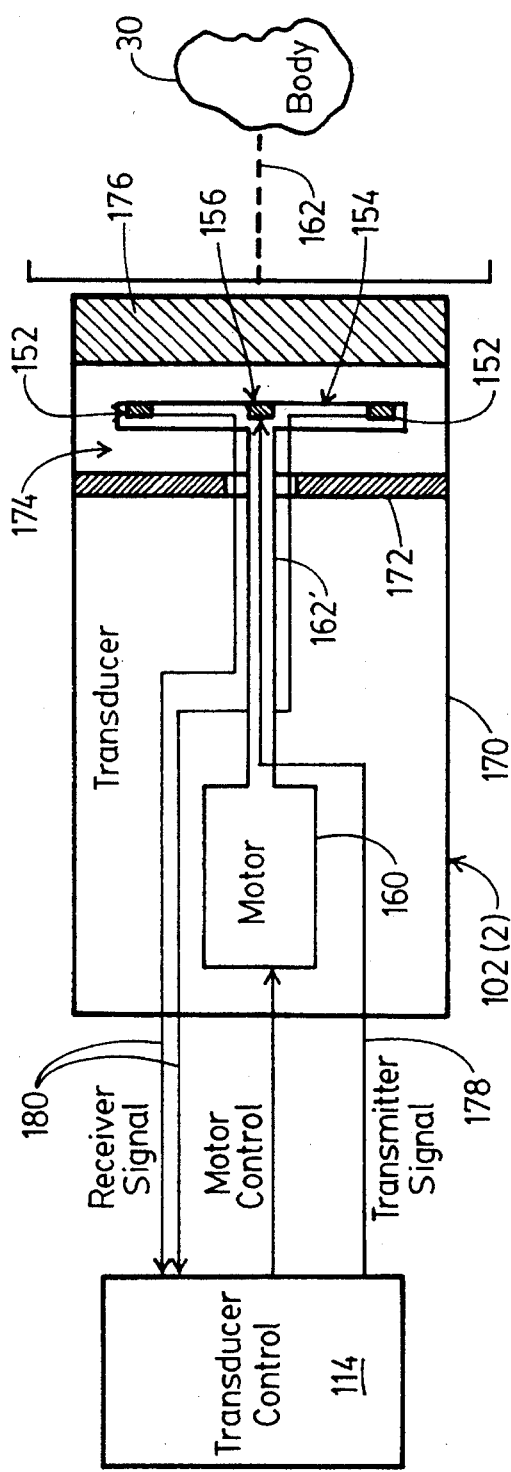
FIG._4A.
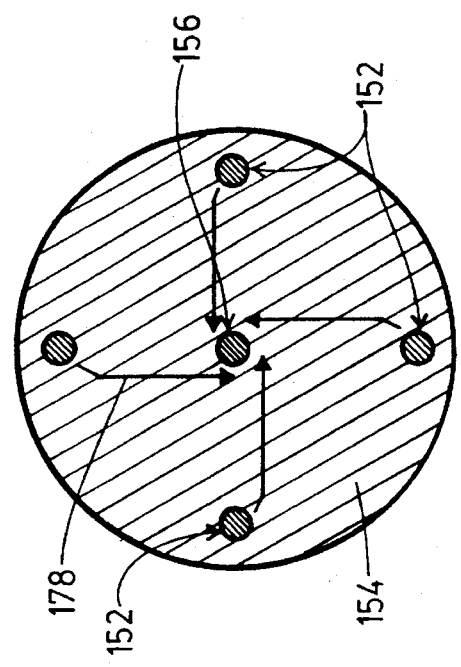
FIG._4B.

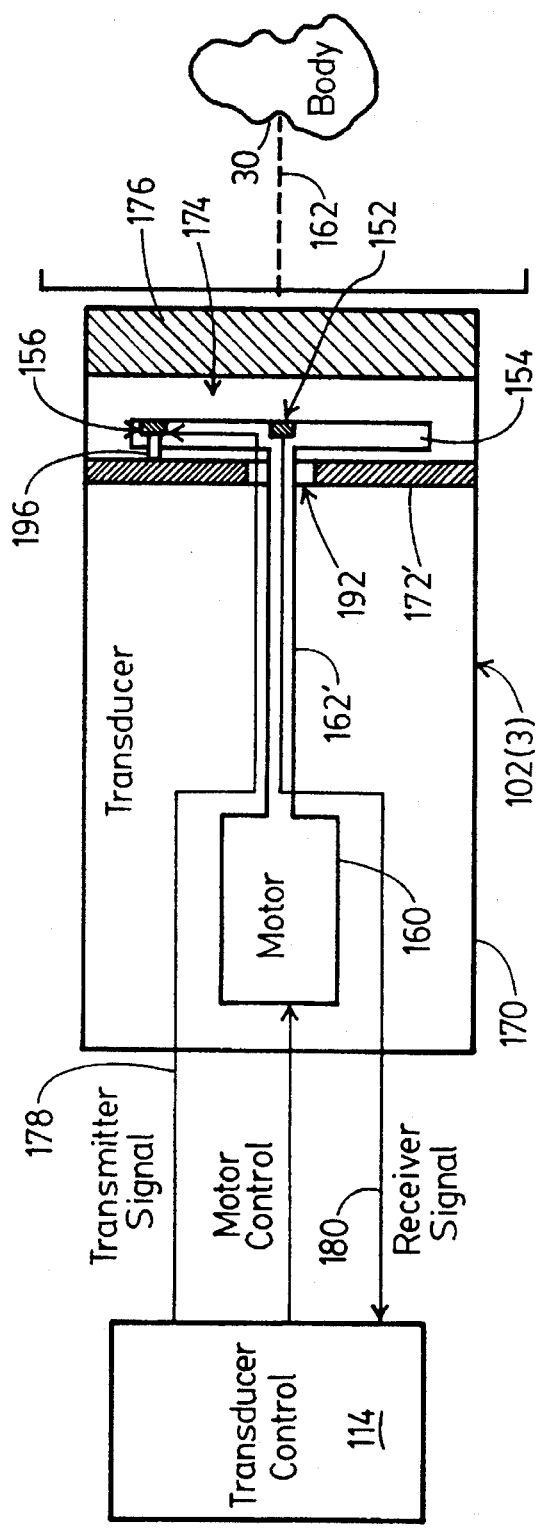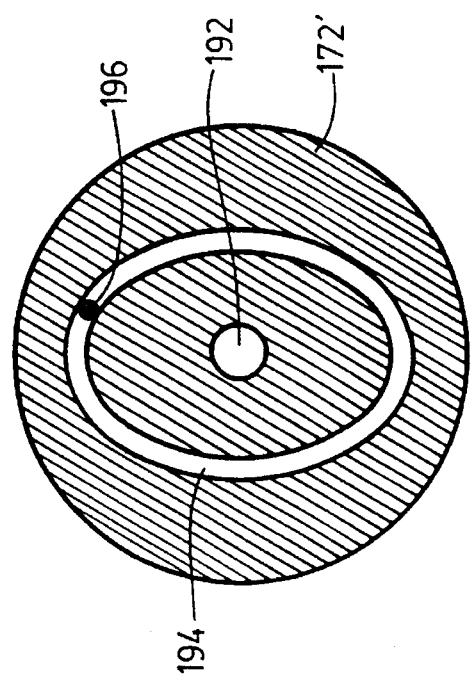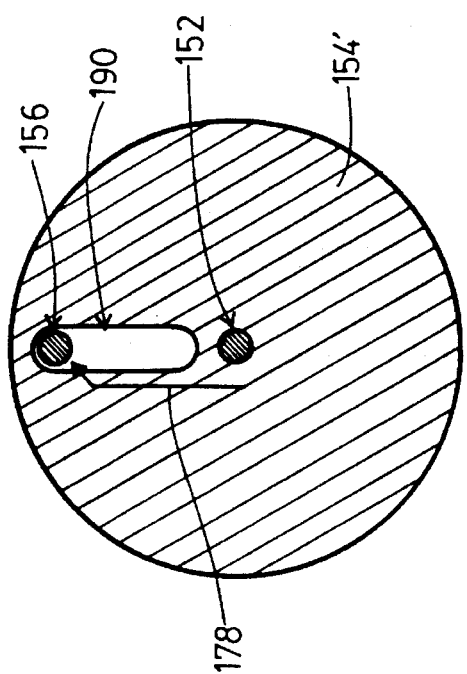

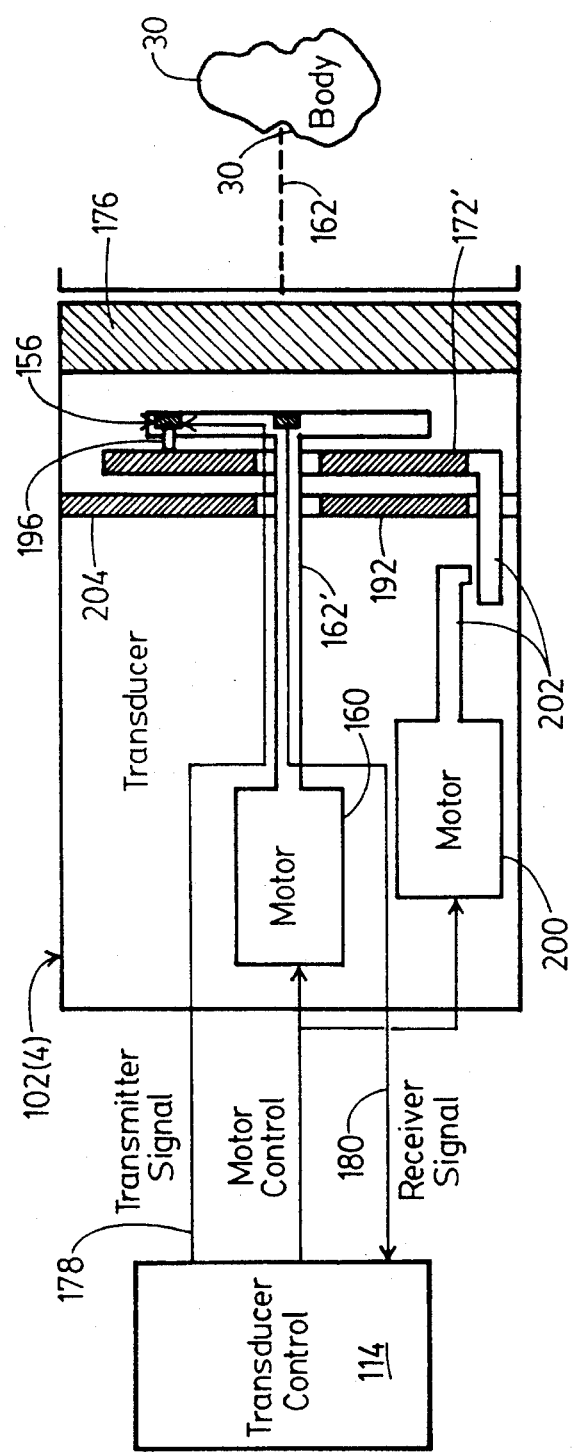
FIG._6A.
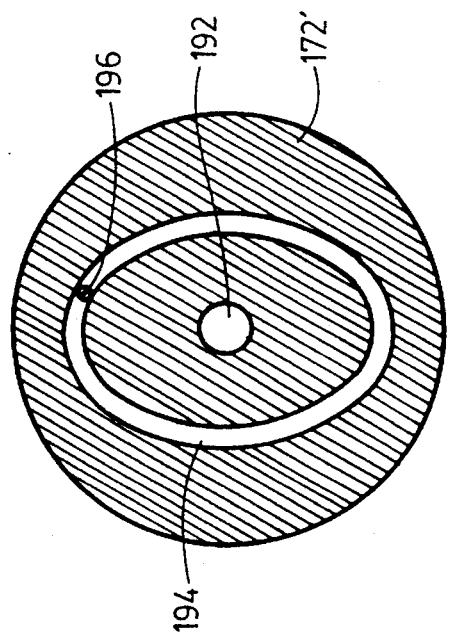
FIG._6C.
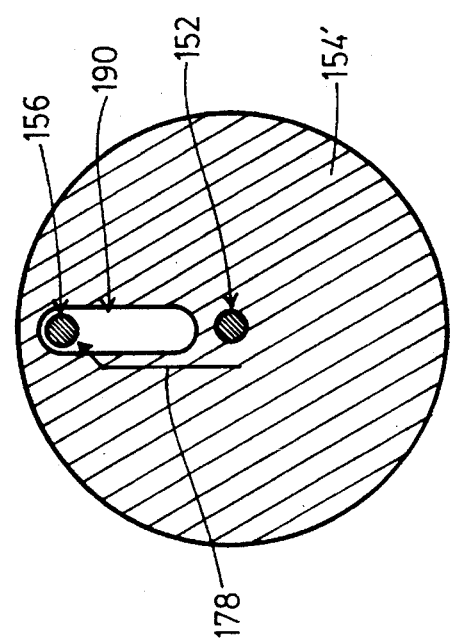
FIG._6B.

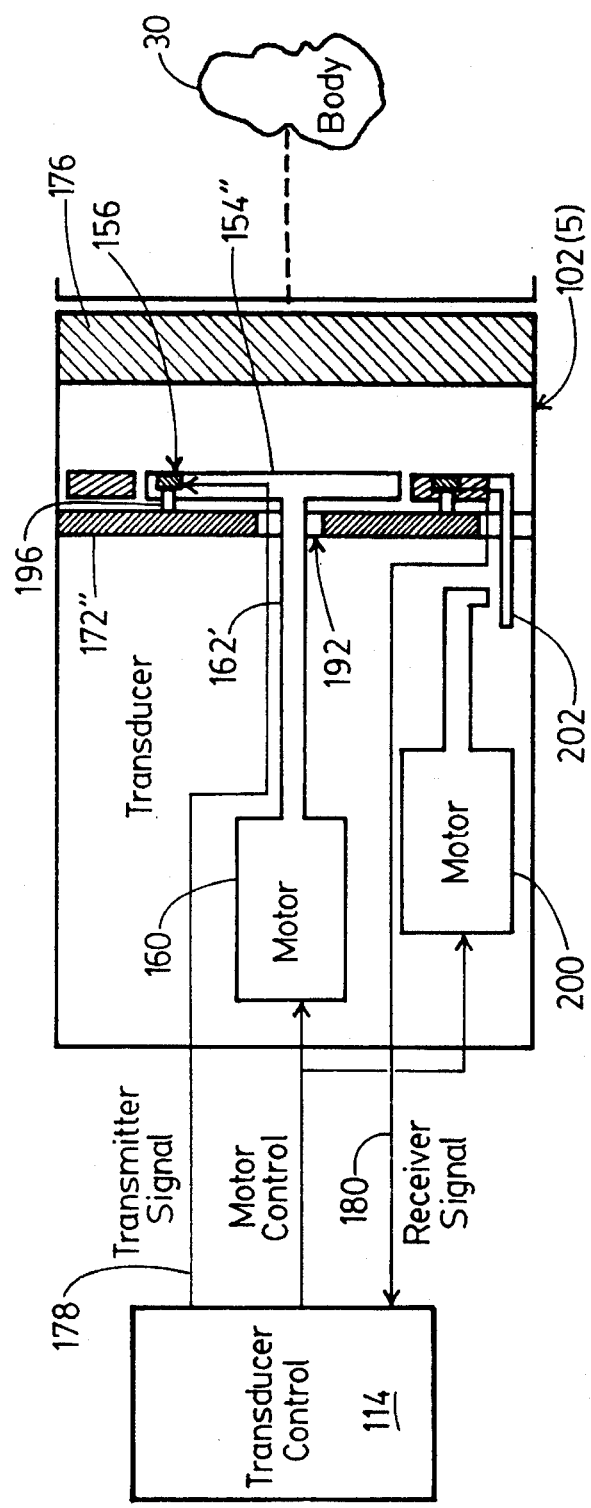
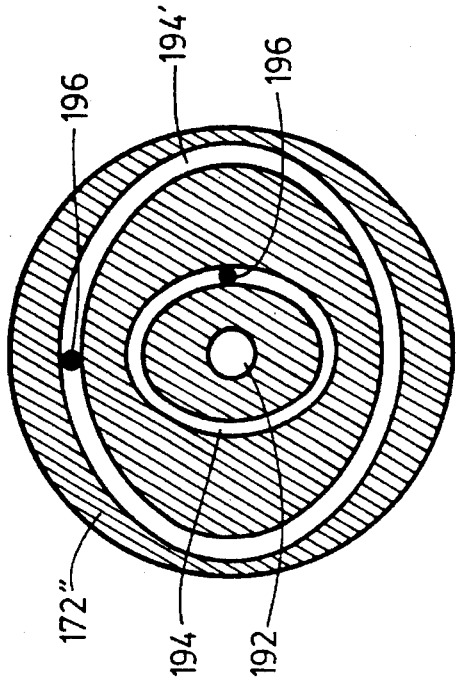
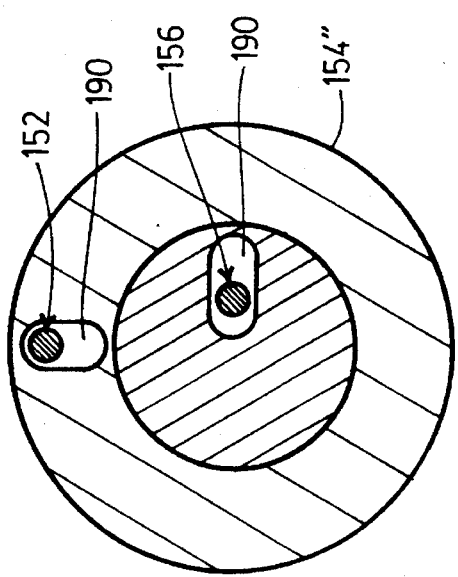
FIG._7A.
FIG._7B.
FIG._7C.

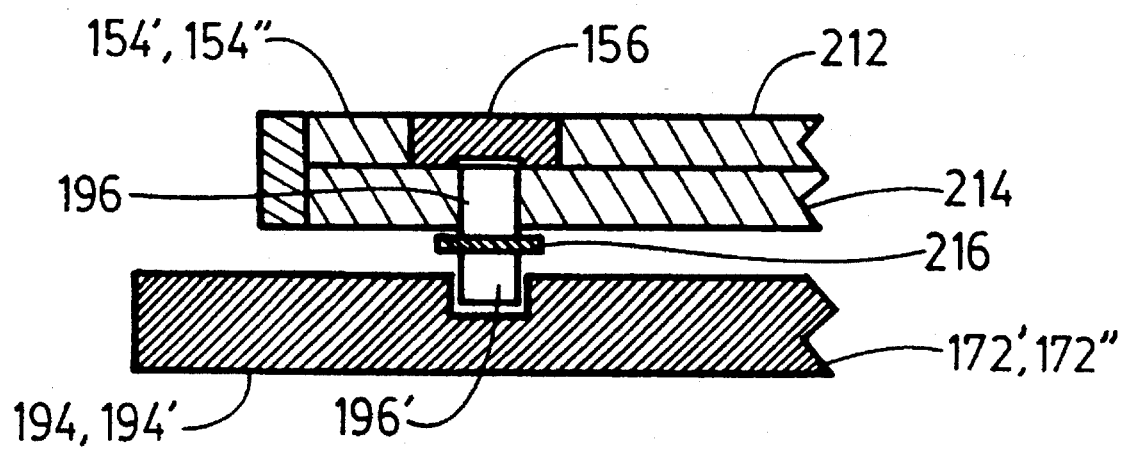
FIG._8A.
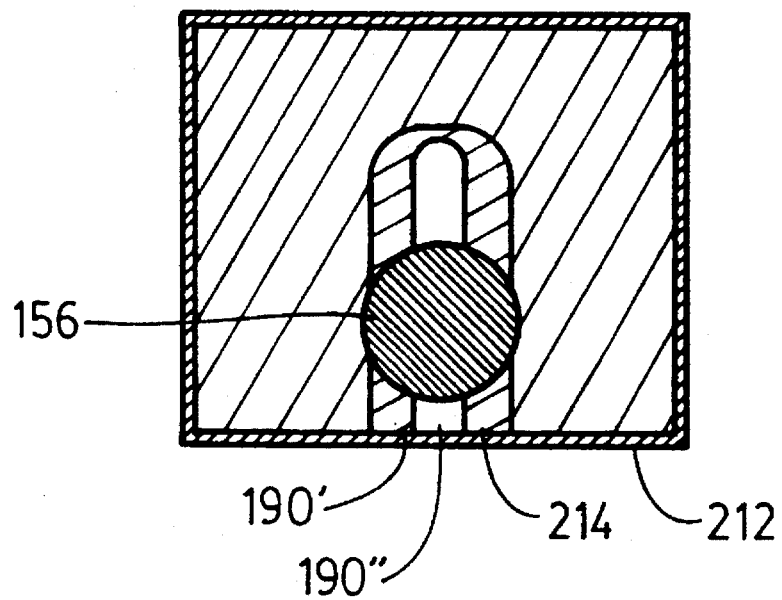
FIG._8B.

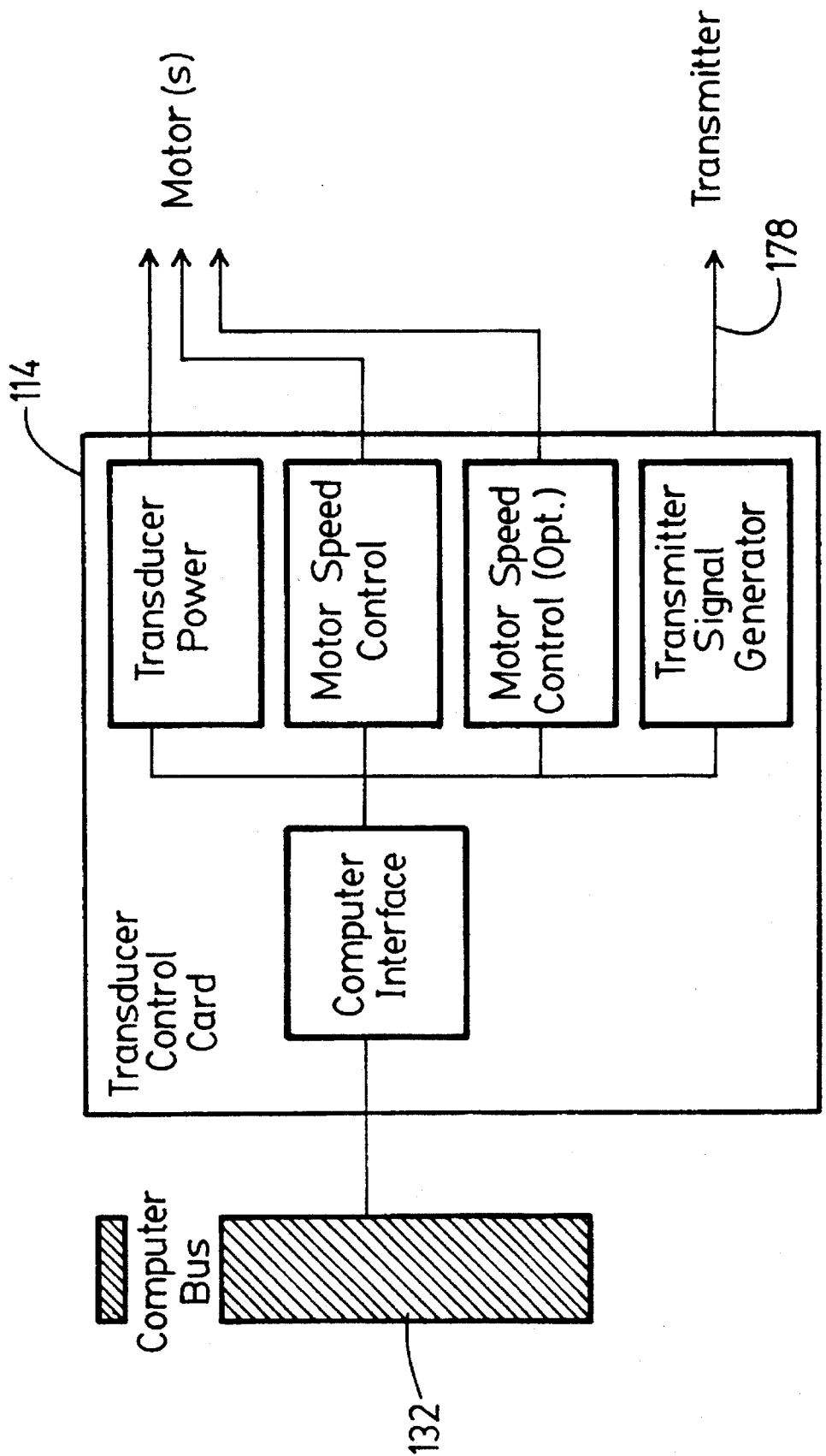
FIG._9.

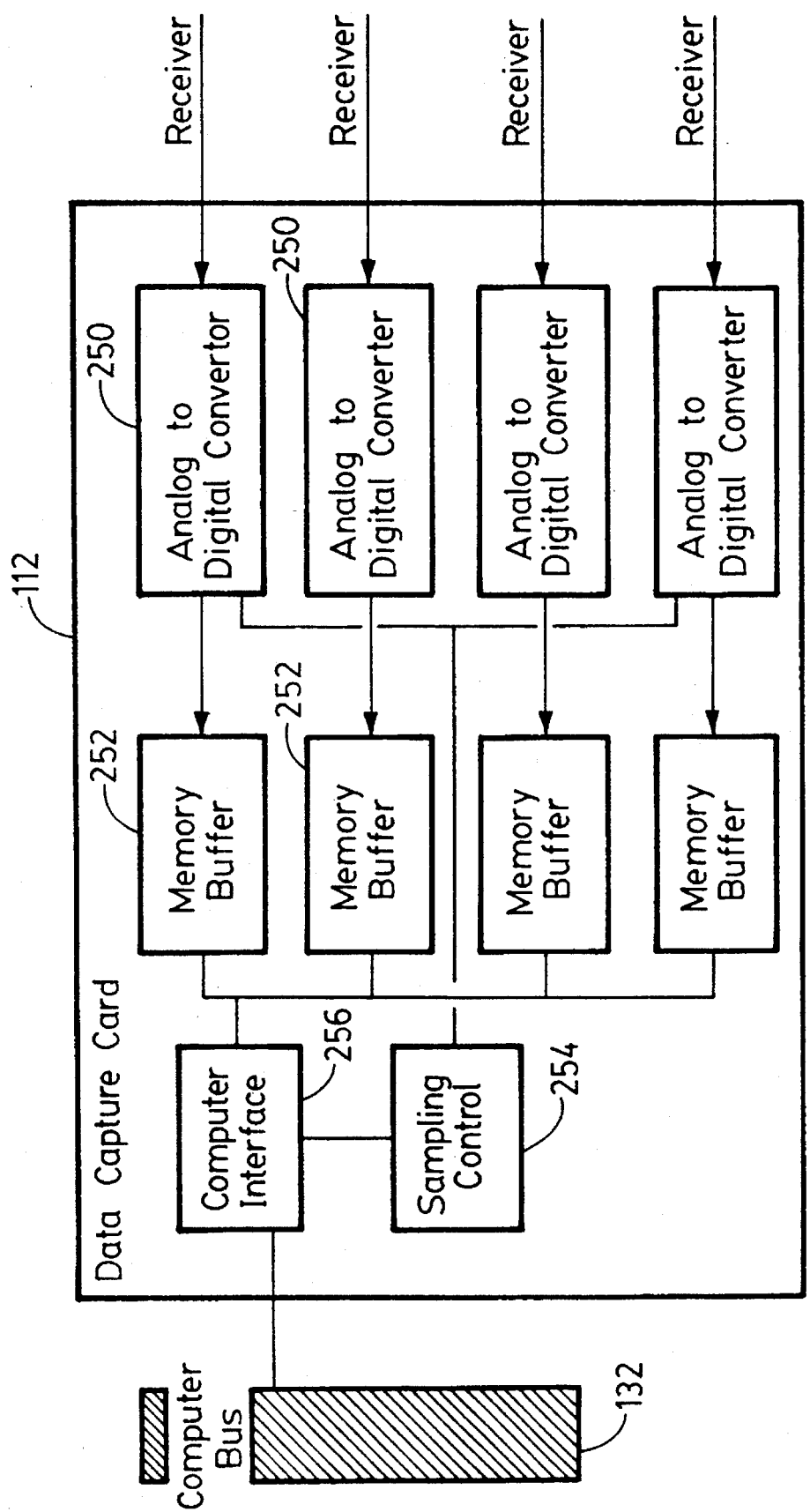
FIG._10.

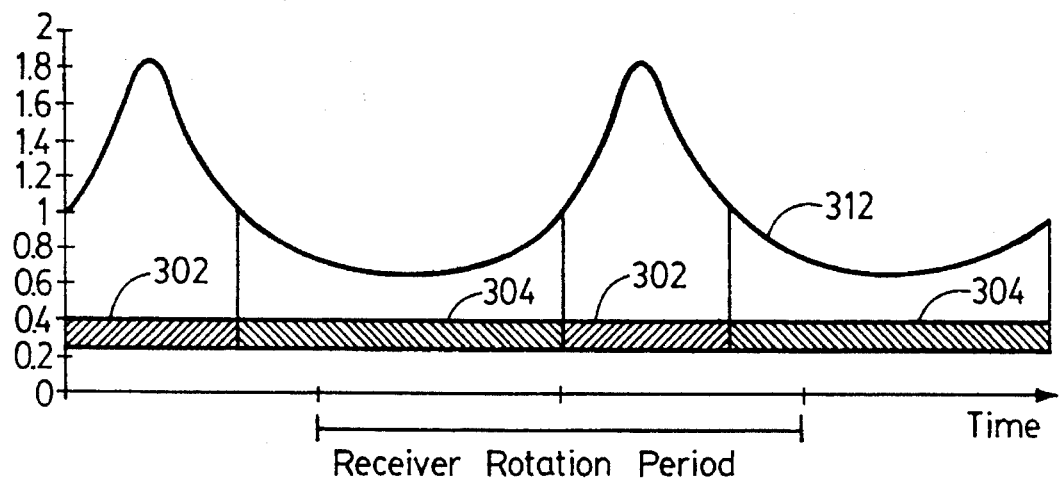
FIG._11.
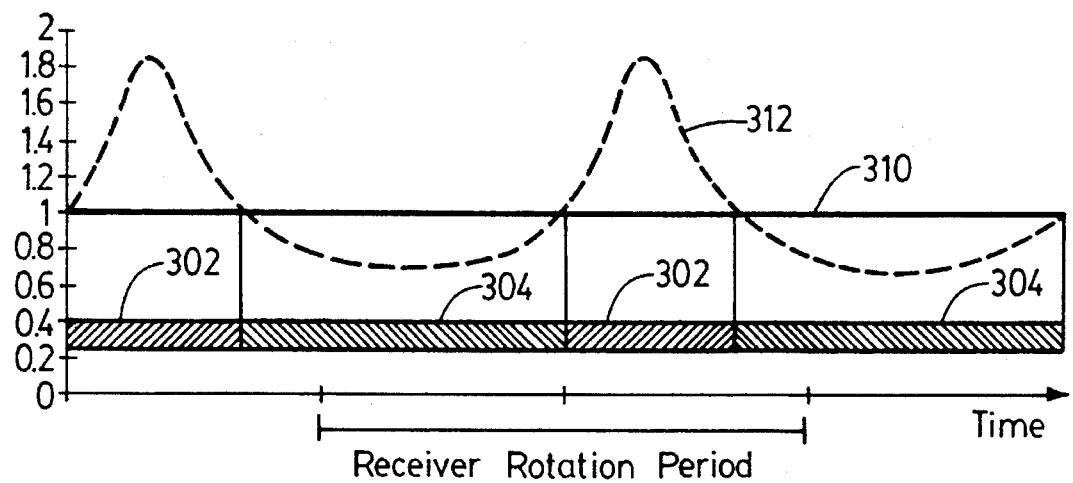
FIG._12.

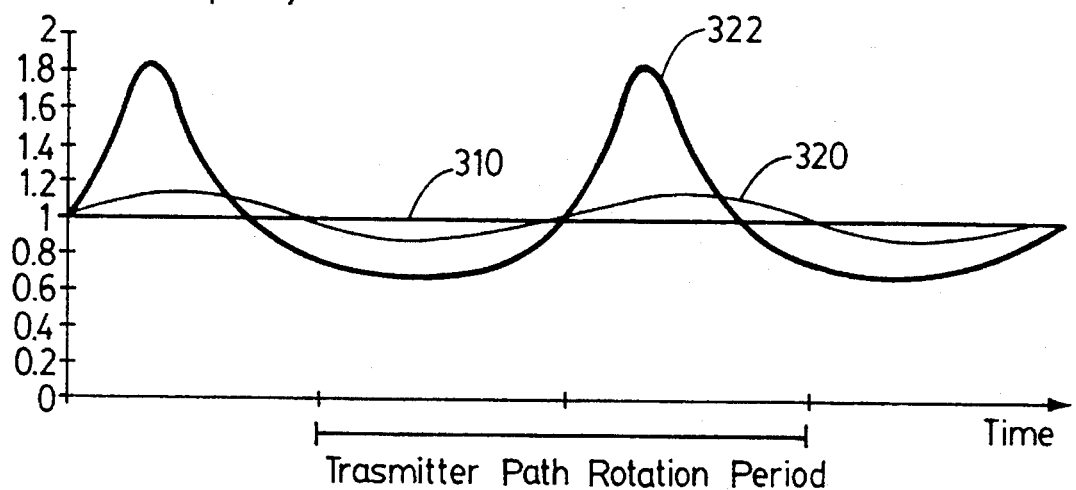
FIG._13.
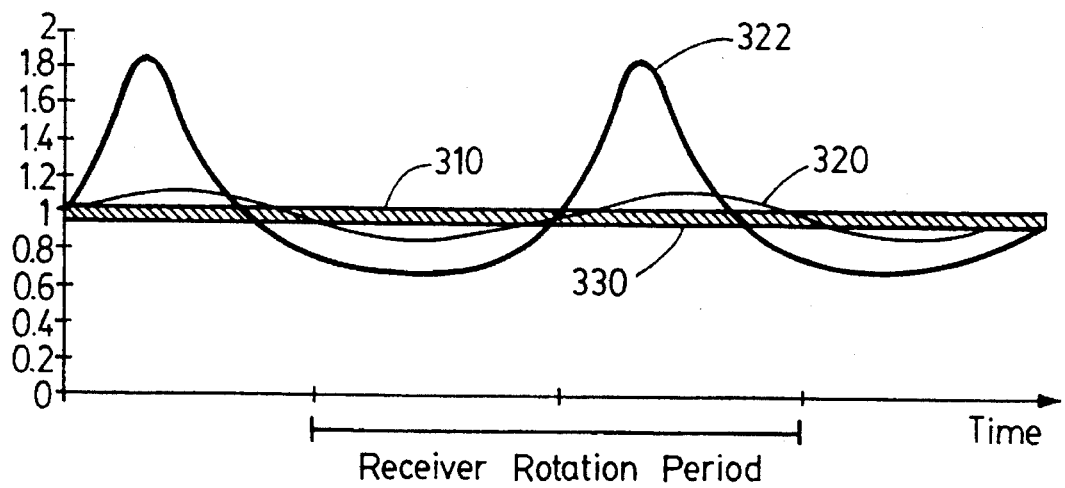
FIG._14.

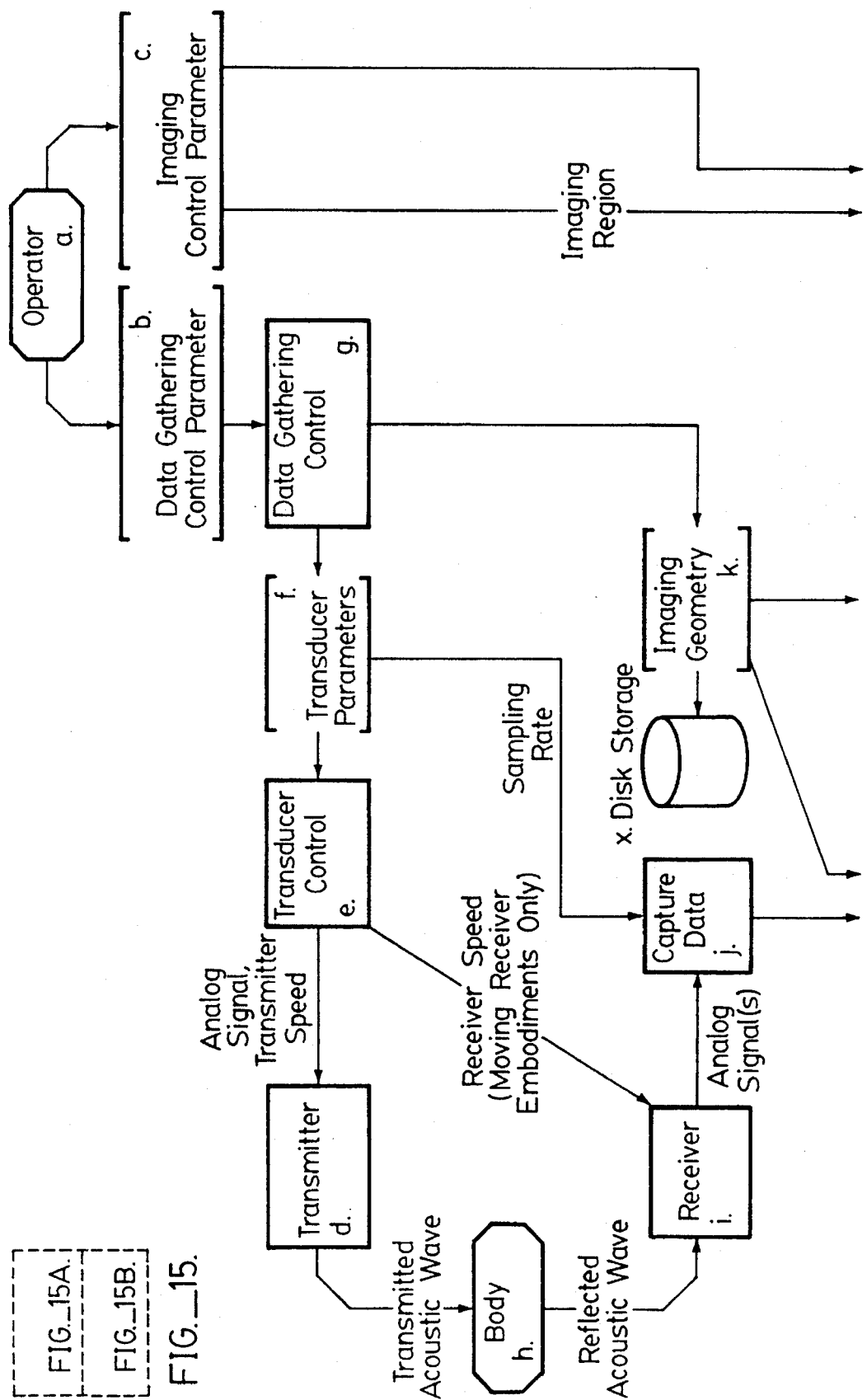
FIG._15A.

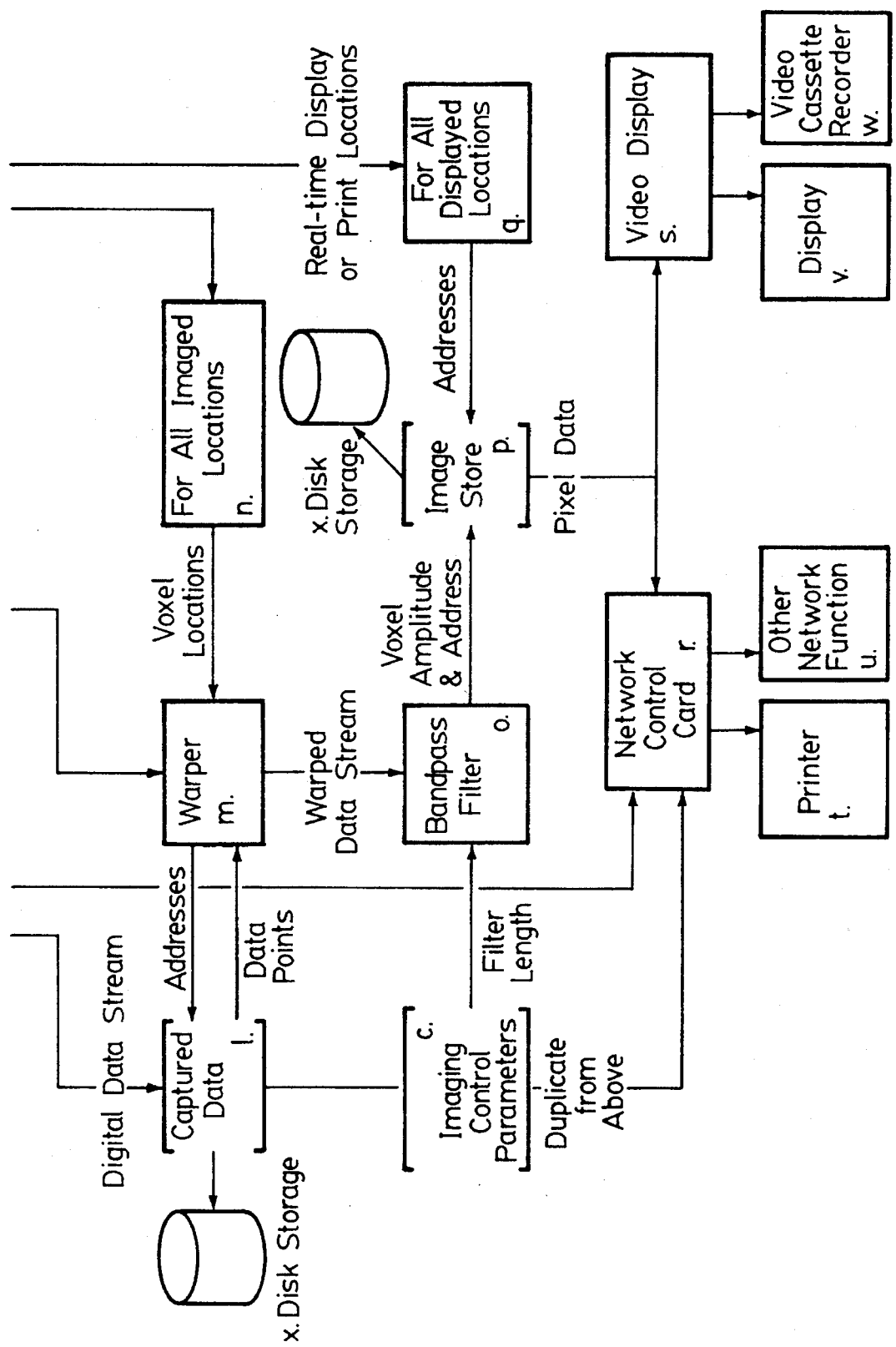
FIG._15B.

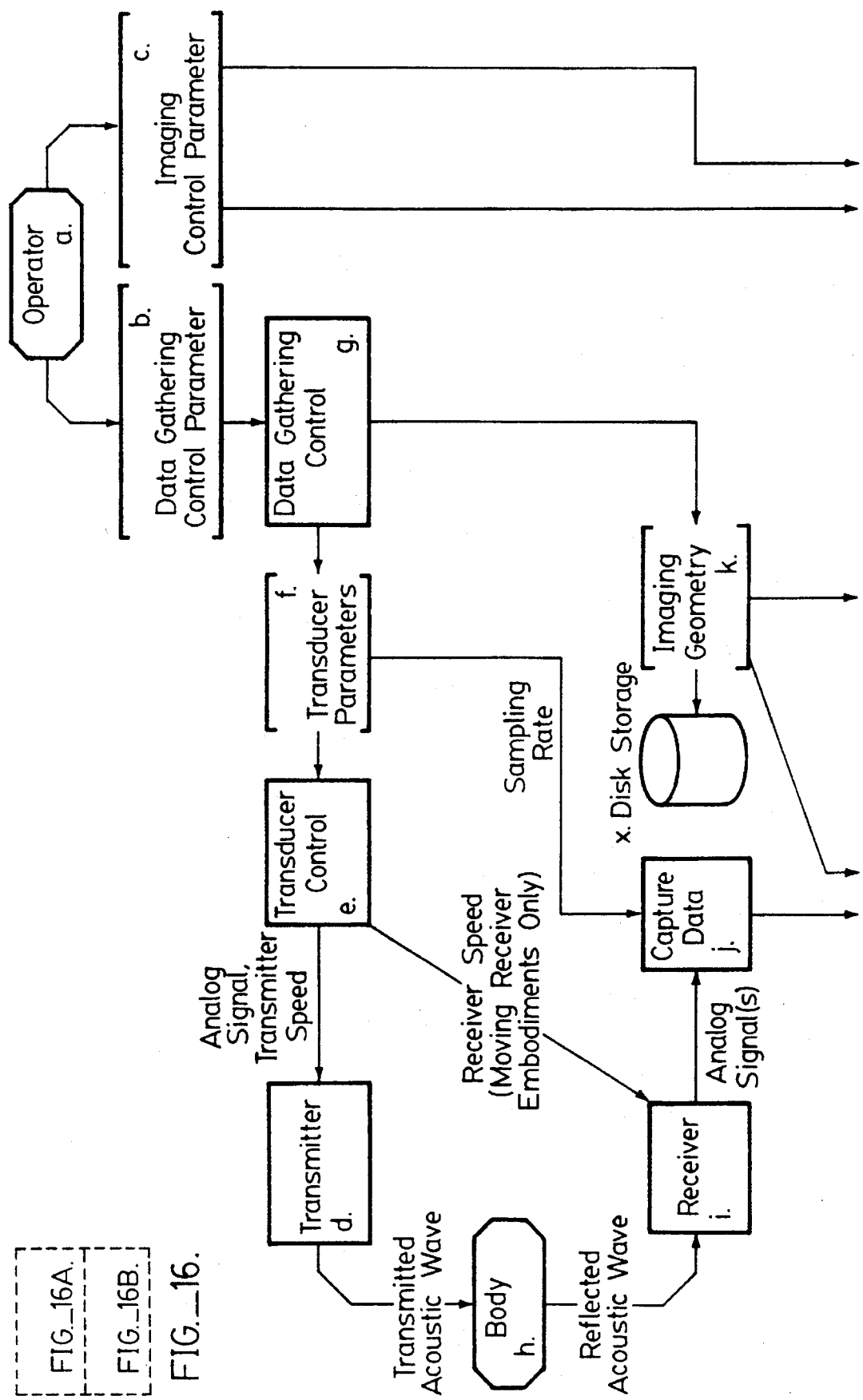

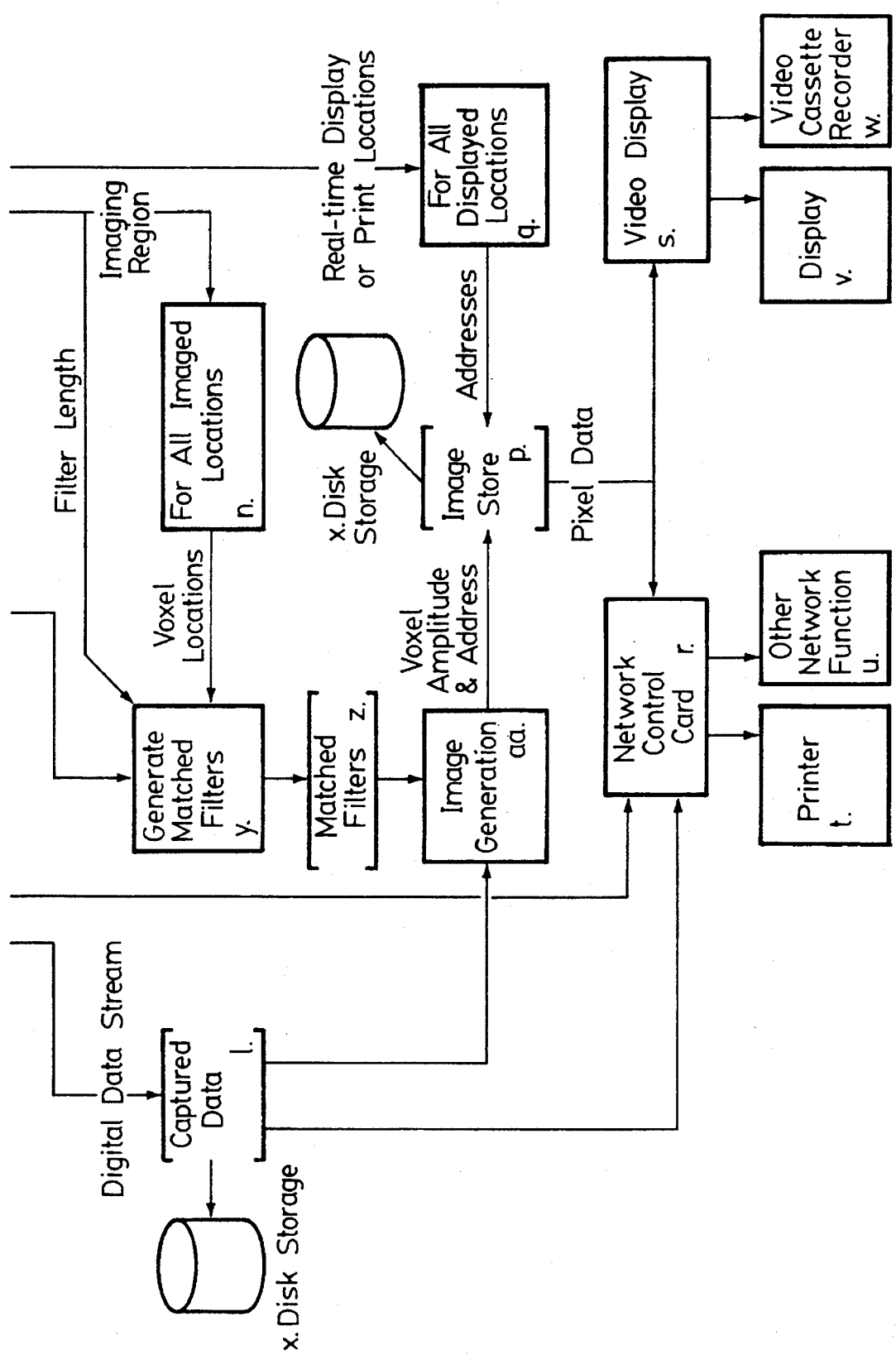
FIG._16B.

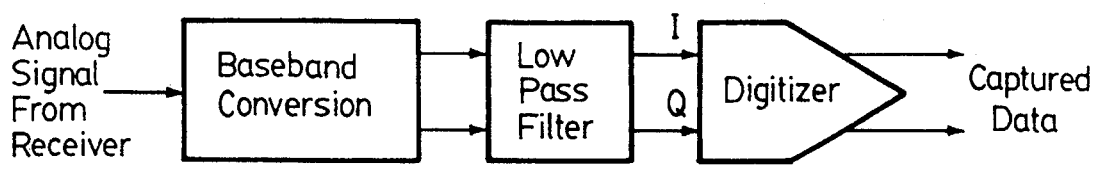
FIG.—17.
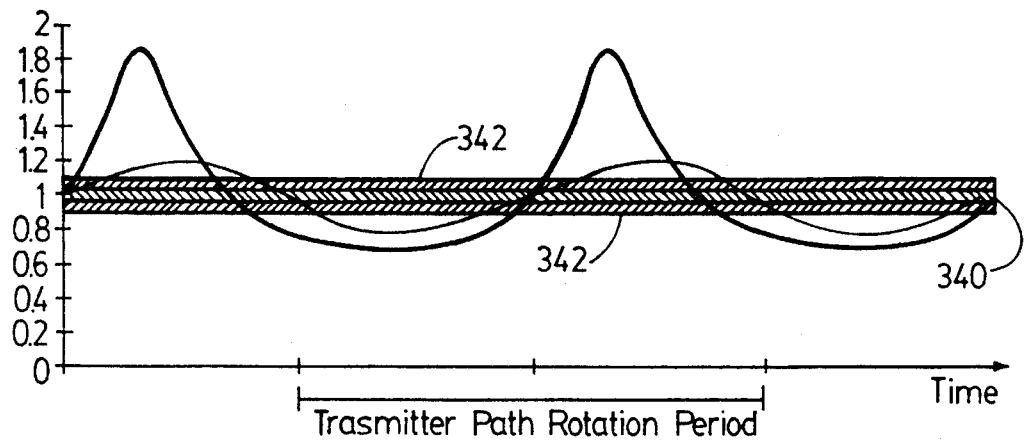
FIG.—18.
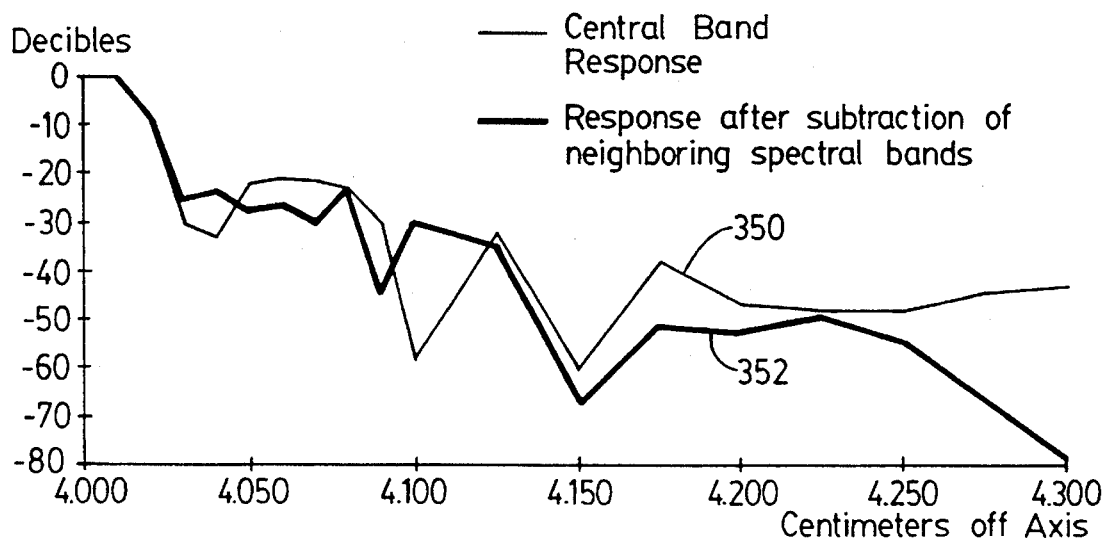
FIG.—19.

SYSTEM FOR IMAGING A REGION

BACKGROUND OF THE INVENTION

This invention relates in general to imaging systems.

Ultrasonic systems have been used in medical imaging as well as other applications. Typically, pulse echo imaging techniques are used. In most common use are linear arrays utilized in systems constructed by Acuson, ATL, Diasonics, and others. These arrays are used to generate a narrowly focused waveform and utilize electronically controlled multi-element transducer arrays. These arrays have improved the ability to focus the ultrasonic pulse thus improving imaging accuracy. However, the arrays currently in use are limited to imaging in two dimensions.

Recently, two-dimensional arrays have been introduced that require additional elements to support an equivalent focusing capability in three dimensions. As the number of ultrasonic elements increases, so does the cost and difficulty of manufacture. All of these systems employ a pulse echo approach and are therefore limited by physical principles in their ability to focus their ultrasonic beam. These systems are unable to focus a pulse narrower or shorter than the ultrasonic wavelength employed by the systems. There is therefore a lower limit to the resolution of these systems. Employing ultrasound at higher frequencies is possible but is disadvantageous since the proportion of energy absorbed by the body in medical applications increases with the frequency of the ultrasound, thereby limiting imaging depth at high frequencies.

To alleviate the above-described difficulties in conventional pulse echo approaches, back propagation techniques have been proposed. In these techniques, a broad ultrasonic beam of pulses is transmitted and the times of arrival of the pulses at a number of receivers around the image region are then measured. Back propagation techniques do improve imaging accuracy beyond the limitations of traditional pulse echo systems by achieving imaging accuracy corresponding to fractional wavelength of the ultrasound. Back propagation systems, however, are limited by their physical configuration and are predominantly two-dimensional imaging devices. In order to image a three-dimensional volume, a large number of transducers would be required, thereby increasing cost and decreasing flexibility to the point when such systems may be impractical based on the current technology.

None of the above-described systems is entirely satisfactory. It is therefore desirable to provide an improved system for imaging a region where the above-described difficulties are not present.

SUMMARY OF THE INVENTION

One aspect of the invention is directed towards an acoustic system for imaging a region comprising a transmitter transmitting an acoustic signal towards the region, said region reflecting said acoustic signal to generate a modified acoustic signal, and a receiver providing an output signal in response to said modified acoustic signal. The system also comprises a device moving the transmitter or the receiver substantially continuously relative to the body to cause a Doppler phase shift of the receiver output signal relative to the transmitted signal. The transmitted signal is continuous for at least a time period during which said device is moving the transmitter or receiver. The system further comprises means for determining, using information regarding the Doppler phase shift within said time period, the amplitudes of signals reflected from different portions of the region in order to provide an image of the region. In the preferred embodiment, the determining means uses information regarding the Doppler phase shift between the transmitted signal during said time period and the receiver output to determine the amplitudes of signals reflected from different portions of the region in order to provide an image of the region.

Another aspect of the invention is directed towards a method for imaging a region comprising the following steps: transmitting from a transmitting location an acoustic signal towards the region, said region reflecting said acoustic signal to generate a modified acoustic signal; receiving at a receiving location said modified acoustic signal and providing an output signal in response to said modified acoustic signal; and moving the transmitting or the receiving location substantially continuously relative to the body to cause a Doppler phase shift of the output signal relative to the transmitted signal. The transmitted signal is continuous for at least a time period during which said location is moved. The method further comprises determining, using information regarding the Doppler phase shift within said time period, the amplitudes of signals reflected from different portions of the region in order to provide an image of the region. In the preferred embodiment, the determining step uses information regarding the Doppler phase shift between the transmitted signal during said time period and the output signal to determine the amplitudes of signals reflected from different portions of the region in order to provide an image of the region.

A more general aspect of the invention is directed to an apparatus and method essentially as described above, but where the signal transmitted and received can be one other than acoustic. Such system and method are set forth below.

One such aspect of the invention is directed towards a system for imaging a region comprising a transmitter transmitting a signal towards the region, said region reflecting said signal to generate a modified signal, and a receiver providing an output signal in response to said modified signal. The system also comprises a device moving the transmitter or the receiver substantially continuously relative to the body to cause a Doppler phase shift of the receiver output signal relative to the transmitted signal. The transmitted signal is continuous for at least a time period during which said device is moving the transmitter or receiver. The system further comprises means for determining, using information regarding the Doppler phase shift within said time period, the amplitudes of signals reflected from different portions of the region in order to provide an image of the region.

Another aspect of the invention is directed towards a method for imaging a region comprising the following steps: transmitting from a transmitting location a signal towards the region, said region reflecting said signal to generate a modified signal; receiving at a receiving location said modified signal and providing an output signal in response to said modified signal; and moving the transmitting or the receiving location substantially continuously relative to the body to cause a Doppler phase shift of the output signal relative to the transmitted signal. The transmitted signal is continuous for at least a time period during which said location is moved. The method further comprises determining, using information regarding the Doppler phase shift within said time period, the amplitudes of signals reflected from different portions of the region in order to provide an image of the region.

BRIEF DESCRIPTION OF THE DRAWINGS

FIG. 1 is a block diagram of a system for imaging a region to illustrate the invention.

FIG. 2 is a block diagram illustrating in more detail the system control and signal analysis functions of the system of FIG. 1.

FIG. 3A is a schematic diagram of a transducer illustrating an embodiment of a portion of the system of FIG. 1 where a single transmitter or receiver is rotated in a circular path.

FIG. 3B is a top view of a transducer disk illustrating the relative positions of the single transmitter and single receiver in the transducer of FIG. 3A.

FIGS. 4A, 4B are schematic and top views of a first alternative embodiment of the transducer portion of the system of FIG. 1 where the transducer includes a stationary transmitter and multiple moving receivers.

FIGS. 5A-5C are schematic and top views of a second alternative embodiment of the transducer portion of the system of FIG. 1, including a single transmitter and receiver where the transmitter or receiver is moved along a fixed elliptical path.

FIGS. 6A-6C are schematic and top views of a third alternative embodiment of the transducer portion of the system of FIG. 1, including a single transmitter and receiver, where the transmitter and receiver are both rotated to permit control of periodicity.

FIGS. 7A-7C are schematic and top views of a fourth embodiment of the transducer portion of the system of FIG. 1, including a single transmitter and a single receiver where both the transmitter and receiver are rotated along paths different from those illustrated in FIGS. 6A-6C, to permit control of periodicity.

FIG. 8A is a cross-sectional view of a portion of a pin assembly and transducer disk that may be used in the transducer of this application to illustrate the preferred embodiment of this invention.

FIG. 8B is a top view of the pin assembly and transducer disk of FIG. 8A.

FIG. 9 is a block diagram illustrating in more detail the transducer control function of FIG. 2.

FIG. 10 is a block diagram illustrating in more detail the data capture function of FIG. 2.

FIG. 11 is a graphical illustration of the instantaneous frequencies over time in the signal detected by the receiver of the system of FIG. 1 to illustrate the Doppler phase shift of the signal detected by the receiver.

FIG. 12 is a graphical illustration of the instantaneous frequencies of the signal detected by the receiver in the system of FIG. 1 to illustrate the warped return from $voxel_{(x,y,z)}$.

FIG. 13 is a graphical illustration of the instantaneous frequencies of the signal detected by the receiver in the system of FIG. 1 at two neighboring voxels.

FIG. 14 is a graphical illustration of the instantaneous frequency over time illustrating the effect of filter length on the signal-to-noise ratio in the signal detected by the receiver after the signal has been filtered by a bandpass filter.

FIGS. 15A, 15B are processor data flow diagrams illustrating the operation of an imaging system to illustrate an embodiment from this invention.

FIGS. 16, 16A, 16B are a processing data flow diagrams showing the operation of an imaging system to illustrate the preferred embodiment of the invention.

FIG. 17 is a block diagram of a system for baseband conversion of the receiver output signal prior to filtering it to illustrate the preferred embodiment of the invention.

FIG. 18 is a graphical plot of instantaneous frequency of the detector output as percentage of base frequency of the transmitted signal versus time to illustrate the central passband and neighboring side passbands for a target object.

FIG. 19 is a graphical plot of the spatial response of receiver output amplitude after the receiver output has been filtered by means of Discrete Fourier Transform before and after subtraction of neighboring spectral band from the central spectral band to illustrate the preferred embodiment of the invention.

For simplicity, identical components in the different figures of this application are labeled by the same numerals.

DETAILED DESCRIPTION OF THE PREFERRED EMBODIMENT

FIG. 1 is a block diagram illustrating a system 20 imaging a region 22 to illustrate the invention. System 20 includes a transmitter 24 emitting a continuous wave ultrasonic signal generated by generator 26 into region 22. Region 22 includes a background 28 and one or more reflective objects 30, or different portions 30 of the same object, such as a human body in medical applications. For simplicity, the invention will be illustrated below in reference to FIGS. 3A-7C by reference to different portions of the same body, although the invention is equally applicable to where one or more distinct objects 30 are imaged in the region 22.

The ultrasonic signal transmitted by transmitter 24 is reflected by background 28 in the form of low-level or low amplitude return signals and high amplitude reflected signals reflected by portions 30. In medical as well as other applications, an important object for imaging systems is to differentiate between signals reflected by different objects 30 or different portions of a single three-dimensional object in region 22.

By moving the transmitter 24, or receiver 34, or both, a Doppler phase shift is created between the reflected signals detected by receiver 34 and that transmitted by transmitter 24. In the conventional pulse echo systems or back propagation systems described above, the differentiation between signals reflected by different objects or different portions of the same object in region 22 is performed by measuring the times of arrival of pulses. This invention is based on the recognition that, by transmitting and detecting a continuous wave signal, where the signal is continuous for a time period while either the transmitter and/or the receiver is moving relative to the object, and analyzing the Doppler phase shift in such time period between the continuous wave transmitted and received signals, the differentiation can be made without being limited by the wavelength of the signals employed. The Doppler phase shift between the continuous wave transmitted and received signals may be processed in a manner to accomplish the differentiation between signals reflected from different objects or different portions of the same object in region 22 in a manner described below by reference to preferred embodiments.

In reference to FIG. 1, the transmitter 24 emits a continuous wave ultrasonic signal T having the wave form sin (ωt). For the purpose of illustration, an embodiment of the invention will first be described in a case where the receiver is moving with respect to the imaging region 22 whereas the transmitter is stationary with respect thereto. The location of the transmitter 24 is used as the origin of a three-dimensional Cartesian coordinate system where the receiver's location is given by "$P_x$, $P_y$, $P_z$," where $P_x$, $P_y$, $P_z$ are functions of time. The location of a reflecting object such as object 30 is given by "$O_x$, $O_y$, $O_z$," which is fixed relative to the transmitter.

The received signal S is given by $$S=A\sin[\omega(t-\Phi_{T\to O}-\Phi_{O\to R})] \quad (1)$$

Where $\Phi_{T\to O}$ is a time delay equal to the travel time between the transmitter to an object or portion 30, and $\Phi_{O\to R}$ is the travel time between the object or portion 30 and the receiver. As the object and transmitter locations are fixed in this example, the time delay induced by the object to transmitter path $\Phi_{(T\to O)}$ is constant.

$$\Phi_{(T\to O)}=(O_x^2+O_y^2+O_z^2)^{1/2}/C$$

Where c=speed of sound in the imaged structure.

$\Phi_{(O\to R)}$ varies as a function of time and results in a Doppler shift of the received signal.

$$\Phi_{(O\to R)}=((O_x-P_x)^2+(O_y-P_y)^2+(O_z-P_z)^2)^{1/2}/C$$

Resulting in:

$$S=A\sin\{\omega[t-(((O_x-P_x)^2+(O_y-P_y)^2+(O_z-P_z)^2)^{1/2})/c+((O_x^2+O_y^2+O_z^2)^{1/2})/c]\} \quad (1A)$$

In the above equation (1A), it will be evident that the time delay has two components: one induced by object to transmitter path and the other by the object to receiver path. In this particular case, the object to transmitter path is constant so that only the object to receiver path will change with time and introduce a Doppler phase shift. It will also be evident, however, that equation (1) is generally applicable, such as where the receiver is stationary with respect to the object and the transmitter is moving. In such case, the transmitter to object path varies with time whereas the object to receiver path is constant. Equation (1) is also applicable where both the transmitter and receiver move with respect to the object so that both paths vary with time. In such event, both components of the time delay in the above equation (1) vary with time.

As is evident from equations (1)–(1A), periodic motion of the transmitter and/or receiver is reflected in the received signal. This can inhibit the ability to image objects in the far field that are separated by a multiple of the path period T.

Ambiguity Distance=C·T/2
Where $$\sqrt{O_x^2+O_y^2+O_z^2} \gg \sqrt{P_x^2 P_y^2 P_z^2}$$

In other words, in the far field where the distance between the object and transducer is much greater than the transducer dimensions, the frequency signatures of two objects along the same radial path from the transducer will appear similar but shifted in phase. Range ambiguity is therefore introduced and equal to that shown in the equation above.

In addition, symmetry in the path of the transmitter and/or receiver can introduce ambiguity. This point will be elaborated below.

FIG. 2 is a block diagram illustrating an embodiment of system 20 of FIG. 1. For convenience in deployment, transducer 102 includes transmitter 24 and receive 34 (not shown in FIG. 2). The motion of the transmitter (and/or receiver), signal generation and analysis are all handled by a general purpose computer 104 which may be implemented, for example, using commercially available engineering work stations. Optimal systems would provide good three-dimensional graphics capability for viewing of imaged data, perform scientific calculations well, and contain standard slot for expansion. Computer 104 includes a central processing unit 106 and disk storage 108 that can perform various control and signal analysis functions without dedicated hardware. However, a dedicated signal analysis board 110 will be able to perform the operations faster and at a lower cost. Thus, a commercial off-the-shelf processor board 110 may be used that is optimized for the processing of signal data and performing filtering operations, such as the MC860 from Mercury Computer Systems, Inc., Lowell, Mass. Mathematical computations in signal analysis can be further accelerated by the use of other commercially available boards, such as those produced by Datacube, Inc., Peabody, Massachusetts, and Sky Computers, Inc., Chelmsford, Massachusetts.

The data capture function may be performed by a custom hardware board of common design including an A/D converter, memory for the temporary storage of incoming raw signal data, sampling control logic and a bus interface. The data capture function card 112 will be explained in detail below.

Transducer control function 114 may be implemented by a custom hardware board for driving the motor and transmitting signal to the transducer as will be explained in detail below. Commercial off-the-shelf video display card 116 drives the display of image data on display terminal 118 and video cassette recorder 120 for displaying and recording an imaging session. Standard computer bus 132 connects the different components and hardware systems within computer 104 and is connected through a network interface 134 and a local area network 136 to a printer 138. Computer 104 is controlled through an input device 140 controlled by an operator.

FIG. 3A is a schematic diagram of transducer control 114 and an embodiment of a transducer 102(1) that may be used in the system of FIGS. 1 and 2 where a single transmitter or receiver is rotated in a circular path. FIG. 3B is a top view of the transducer disk 154, receiver 152, transmitter 156, and signal line 178. As shown in FIG. 3A, a receiver 152 is attached to disk 154 at the rotating axis 162 of an axle 162' for rotating transducer disk 154 and a transmitter 156 is attached to the disk at a location away from the axis. Disk 154 is rotated by a motor 160 about axis 162 passing through the location of receiver 152, thereby rotating transmitter 156 about axis 162. The disk, transmitter, receiver and motor as well as axle 162 are enclosed by housing 170. A sound insulating barrier 172 attached to housing 170 separates and insulates the transmitter and receiver from motor 160. Chamber 174 is preferably filled with an impedance matching fluid to minimize internal sound reflections within the portion of housing 170 where the transmitter and receiver are located. Housing 170 includes an impedance matching transducer cover 176. In medical applications, cover 176 may be connected to a patient's body using ultrasound gel to minimize sound reflections from the air-skin interface. Transducer control 114 supplies transmitter signals through line 178 to transmitter 156 and receives the detected signal from receiver 152 through line 180.

In operation, housing 170 is placed in the vicinity of body 30 to be imaged and transducer control 114 sends a motor control signal through line 182 to motor 160 to control rotation of axle 162'. Motor 160 then rotates disk 154 about axle 162', causing transmitter 156 to rotate in a circular path about the axis 162 of axle 162'. Transducer control 114 supplies signals through line 178 to transmitter 156 causing transmitter 156 to emit ultrasound signals to an imaging region including portions 30 of a body. The ultrasound signals reflected by different portions 30 of the body are then detected by detector 152 and detector 152 provides an output, in response to the detected signal, through line 180 to transducer control 114. Computer 104 then analyzes the detector signal and the transmitted signal in order to obtain the amplitudes of ultrasound signals reflected by different portions 30 of the body.

In order for the above-described operation to be able to provide such image, the total ultrasound path length from the transmitter to the body portion and from the portion to the receiver must change as a function of time. If a portion 30 of the body is located along axis 162 of axle 162', the path length from the transmitter 156 to such portion 30 of the body remains constant despite the rotation of the transmitter. Since the receiver is also stationary in the embodiment of FIG. 3A, the total path length does not vary as a function of time so that there is no Doppler phase shift between the transmitted and detected signals and therefore the system of FIGS. 3A, 3B would then fail to provide an image of the body along the axis 162. To remedy such situation, one obvious solution is of course to place the portion away from the axis 162. Alternatively, as explained below, transmitter 156 may be rotated along a path other than a circular path.

FIG. 4A is a schematic view of transducer control 114, a transducer 102(2) and FIG. 4B is a top view of a transducer disk in the transducer of FIG. 4A to illustrate a first alternative embodiment of the transducer of FIGS. 1 and 2. As shown in FIGS. 4A, 4B, transducer 102(2) is the same as transducer 102(1) of FIGS. 3A, 3B, except that in transducer 102(2), instead of receiver 152, the transmitter 156 is attached to transducer disk 154 at a location on the axis 162, and that four receivers 152 are attached to the transducer disk at locations away from axis 162. As discussed above, changing the distance between the object and the receiver will also create a Doppler phase shift between the transmitted and detected signals where the phase shift can be used to differentiate between signals reflected from different portions of the body. Creating a Doppler phase shift by keeping the transmitter stationary with respect to the object and moving the receiver with respect thereto has the advantage that the transmitted signal will not change in frequency when it reaches the object. As is known to those skilled in the art, sonic signals of different frequencies tend to behave differently in imaged structures. If the body is imaged by sonic signals of different frequencies, wide frequency divergence may be introduced that can lead to signal degradation and reduced imaging performance. Using a stationary transmitter and a moving receiver has the advantage by eliminating such signal degradation.

Using multiple receivers as in FIGS. 4A, 4B has the advantage that signal data will be collected at a higher rate, thereby reducing the length of the imaging session necessary to obtain a complete image of the body.

FIG. 5A is a schematic view of transducer control 114 and a transducer 102(3) to illustrate a second alternative embodiment of the transducer of FIGS. 1 and 2. FIGS. 5B, 5C are top views of the transducer disk and barrier or baffle 172' of the transducer of FIG. 5A.

As explained above in reference to FIG. 3A, where a portion 30 of the body is located on the axis 162 and the transmitter is rotated along a circular path, there is no change in the path length between the transmitter and the portion of the body so that the system would then fail to create a Doppler phase shift between the transmitted and received signals. To make it possible to image a portion of the body even though the portion is located on the rotating axis, the embodiment of FIGS. 5A–5C is proposed. As shown in FIGS. 5A–5C, the transducer disk 154' has a slot 190 therein which permits the transmitter 156 to slide there along. Barrier or baffle 172' has a center hole 192 therein that permits the passage of axle 162' as well as an elliptical slot 194 therein as shown in FIG. 5C. Transmitter 156 is connected to pin 196, an end of which is inserted in slot 194 in barrier 172'. Thus, when axle 162' is rotated by motor 160, pin 196 is caused to trace the elliptical path 194 in barrier 172' and slide in slot 190 in the transducer disk 154'. In this manner, the path length between the portion of the body on axis 162 and transmitter 156 will change with time as the transmitter is rotated along the elliptical path 194. This changing path length will cause Doppler phase shift to be created between the transmitted and received signals so that such phase shift can be used for imaging the portion of the body.

FIG. 6A is a schematic view of transducer control 114 and a transducer 102(4) to illustrate a third alternative embodiment of the transducer of FIGS. 1 and 2. FIGS. 6B, 6C are top views of the transducer disk and barrier respectively of the transducer of FIG. 6A.

The embodiment of FIGS. 6A–6C differs from that of FIGS. 5A–5C in that barrier 172' is also rotated, but in a manner independently of the rotation of the transducer disk. Thus, as shown in FIG. 6A, an additional motor 200 rotates a gear mechanism 202 which engages baffle 172' and causes the baffle to also rotate. An additional sound deadening baffle 204 is provided to isolate the transmitter and receiver from the motors.

FIG. 7A is a schematic view of transducer control 114 and a transducer 102(5) to illustrate a fourth alternative embodiment of the transducer of FIGS. 1 and 2. FIGS. 7B, 7C are top views of the transducer disk and baffle of the transducer of FIG. 7A.

The embodiment of FIGS. 7A–7C differs from the previous embodiments in that both the transmitter and receiver are rotated independently and along different elliptical paths. Thus, the transducer disk is formed by an outer disk 154" and inner disk 154''' each having a slot 190 therein, one for constraining the motion of transmitter 156 and the other for constraining the motion of receiver 152. Both the transmitter and the receiver are connected to pins 196, one end of each being inserted into one of the slots 194,194' in baffle 172". As the inner disk 154''' is rotated by motor 160 through shaft 162', outer disk 154" is rotated by a separate motor 200 and gear mechanism 202.

As described above in the embodiment of FIGS. 6A–6C, 7A–7C, by providing more flexibility in designing the reciprocating paths of the transmitter alone (as in FIGS. 6A–6C), or by causing both the transmitter and receiver to reciprocate along elliptical paths (FIGS. 7A–C), it is possible to increase the period of the time variation in path length between the transmitter, portions of the body, and the receiver. This has the advantage of increasing the number of data points that may be taken during each reciprocating cycle and increases the resolution of the system.

FIG. 8A is a cross-sectional view of a pin assembly, and a portion of the transducer disk and baffle that may be used in the above embodiments to illustrate the preferred embodiment of the invention. FIG. 8B is a top view of the pin assembly. As shown in FIGS. 8A, 8B, the transducer disk 154', 154" may comprise two layers 212,214, where layer 212 defines a slot 190' therein large enough to accommodate the size of the transmitter 156 and layer 214 defines a narrower slot 190" therein narrower than the dimensions of transmitter 156 but large enough to accommodate pin 196. A nut or rivet 216 engages pin 196 and locks the transmitter in place in slot 190' in layer 212. End 96' of pin 196 protrudes into slot 194,194' in baffle 172', 172". The receiver 152 may be constrained to move along slots using the same mechanism.

FIG. 9 is a block diagram illustrating the transducer control function of the system of FIGS. 1 and 2. As shown in FIG. 9, transducer control card 114 supplies power to the transducer, controls the speed of one or more motors, and generates the transmitter signal that is transmitted by the transmitter. If desired, the signal transmitted by the transmitter may be caused to be frequency modulated upon a base frequency to further increase the resolution of the system. This may be performed in the transmitter signal generator of the transducer control card by mixing a base frequency signal with a modulation signal. Card 114 is controlled by the central processing unit through computer bus 132. By frequency modulating the base frequency signal, range reception and frequency diversity across the body can be enhanced.

FIG. 10 is a block diagram illustrating the data capture function of FIG. 2. As shown in FIG. 10, the data capture card may include a number of A/D converters 250, each digitizing an output of a receiver 152 and supplying a digital output to a memory buffer 252. The sample rate of the converters 250 is controlled by a sampling control signal from sampling control 254. The digital samples from converters 250 are stored in memory buffers 252 which are connected to bus 132 through interface 256. The digital samples in buffers 252 may be processed for imaging in real time during an imaging session, but can also be retrieved at a later time after the imaging sessions for signal analysis and imaging.

A/D converters 250 convert the output of a detector 152 into digital signals. Data capture card 112 may include a plurality of converters 250, each adapted to digitize the output of a receiver so that card 112 may be used for data capture of data from a plurality of receivers simultaneously.

Filtering in the Basic Embodiment

In the following discussion, the process of carrying out various steps using computer 104 in processing the data is explained in reference to the section below entitled "Processor Data Flow—Basic Implementation," where the various steps in the data flow are labeled using alphabets, and in reference blocks in FIGS. 15A, 15B and 16A, 16B labeled with the same alphabets. Where appropriate, the processes described are cross-referenced to the section below by referring to the alphabet within parenthesis. For example, the process of generating an image "(p)" refers to item p in the section "Processor Data Flow—Basic Implementation," and to the block "Image Store p" in FIGS. 15A, 15B and 16A, 16B.

The process of generating an image (p) from captured data (j) is as follows.

A simple example is chosen to illustrate the process for reversing the Doppler time compression and expansion of the ultrasound signal caused by the movement of the transmitter and/or receiver and then filtering the signals in order to determine the amplitudes of the signals reflected by different portions of the body. The process of reversing the Doppler time compression and expansion of the signal is referred to below as "warping." While the process below is illustrated by reference to a stationary transmitter and a moving receiver, it will be understood that the same process can be applied to an embodiment where the transmitter is moving and the receiver is stationary, or where both the transmitter and receiver are moving.

In the basic embodiment, a single transmitter and receiver are utilized. The transmitter is stationary and located at the origin of the transducer. The receiver is moving along a path P with position and velocity that change with time. The transmitter is emitting a continuous wave (continuous for a time period) fixed frequency at base frequency $\omega$ signal:

$$T=\sin(\omega t)$$

In this embodiment, data reflected from acoustic interfaces (as a result of the continuous wave transmitted signal) within the body would be captured by the receiver, digitized and stored in digital form as captured data (l.). The geometry defining the imaging conditions would have been similarly stored as the imaging geometry (k.). The system would then iteratively recall this data over a set of voxels to be imaged (n.). A voxel is a three-dimensional volume of arbitrary dimensions similar in concept to a pixel but applied to three-dimensional space.

The function "For All Imaged Locations (n)" passes a voxel location, $O_{(x,y,z)}$, to the warper function (m). The reflected energy from $O_{(x,y,z)}$ is:

$$S=A\sin\{\omega[t-((O_x-P_x)^2+(O_y-P_y)^2+(O_z-P_z)^2)^{1/2}/c-(O_x^2+O_y^2+O_z^2)^{1/2}/c]\}$$

This energy is captured and digitized in combination with the reflected energy from all other points in the imaged body in addition to random noise. Although the transmitter emits a constant frequency signal, the movement of the receiver causes Doppler time compression and expansion of the emitted signal as seen by and reflected from the object at $O_{(x,y,z)}$. As a result, the instantaneous frequency of the signal received from $O_{(x,y,z)}$ varies about the base frequency $\omega$ (see FIG. 11).

Given as inputs the imaging geometry, the (x,y,z) location of the voxel O, and the captured data stream, the warper functions to compensate for and remove any Doppler-induced time compression and/or expansion in the reflected signal from voxel O. A warped data stream is produced within which the signal reflected from voxel O is restored to the base frequency (see FIG. 12). Of course, the application of the warping function affects the frequency profiles of all captured data. Neighboring points near voxel O now vary closely around the base frequency. Points farther distant from voxel O vary more significantly (see FIG. 13). The degree of frequency diversity or variance is dependent on the transmitter path, geometry between the transmitter and the imaged region, the speed of the transmitter, and the base frequency.

The "For all Imaged Locations" function (n) inputs to the warping functions (m) the x,y,z coordinates for all the voxels to be imaged. When these x,y,z coordinates are plugged into the imaging geometry equation (k), a different warping function for each point is produced. The data stream is warped for each and every point within the image.

The warped data stream for voxel $O_{(x,y,z)}$ is then passed to the bandpass filter (o) for further processing. The bandpass filter is designed to extract signals at the base frequency and reject all other signals. The signal reflected from $O_{(x,y,z)}$ was warped such that it is centered at the base frequency in the warped data stream. Thus, by applying the bandpass filter to the warped data stream, the strength of the return from voxel $O_{(x,y,z)}$ can be determined (see FIG. 14). The resulting value is stored as image data (p). The process is repeated for all imaged points.

The operation of the warping function will now be described in detail by reference to a very simple case where the receiver is constrained to move along a straight line along an x axis where the coordinates ($P_x$, $P_y$, $P_z$) are given by:

$P_x = \sin(\omega_1 t)$;
$P_y = 0$;
$P_z = 0$.

The position of the object 0 to be imaged in x, y and z is:

$O_x = x$;
$O_y = 0$;
$O_z = 0$.

For this case, the reflected signal S is given by:

$$S = A\sin\{\omega[t - (x - \sin(\omega_1 t))/c - x/c]\}; \quad (2)$$
$$= A\sin\{\omega[t - (2x - \sin(\omega_1 t))/c]\}.$$

The transmitted signal T was:

$T = \sin(\omega t)$.

The bandpass filter is designed to filter out a signal of frequency $\omega$ sampled at a rate R. The ith sample is collected at time $t = i/R$.

Thus, the ith sample $T_i$ of the transmitted signal is given by $\sin(\omega i/R)$. In order to warp the reflected signal S from the object so as to reverse the time compression/expansion effects of the Doppler phase shift, the sampling time for the corresponding ith sample of S is changed so that the time varying portion of the reflected signal S sampled at such time is equal to that of the transmitted signal. This can be accomplished by setting equal the time varying portions of S and T and then solving for the sampling time $I_i$ in the manner shown below:

Set $t = I_i$ in equation (2)

$$\sin(\omega i/R) = \sin\{\omega[I_i - (x - \sin(\omega_1 I_i))/c - x/c]\} \; \omega i/R = \omega[I_i - (x - \sin(\omega_1 I_i))/c - x/c] \; I_i + \sin(\omega_1 I_i)/c = i/R + 2x/c \quad (3)$$

Equations similar to equation (3) above can be derived in a similar manner for cases where the transmitter is moving or where both the transmitter and receiver move relative to the imaged object. The calculated sampling time $I_i$ of the warped data in equation (3) is used to address the captured array data C. An interpolating filter is used to calculate the signal value returned given an $I_i$ with a fractional component. The whole part of the address $I_i$ is used to derive a warped array data D. The neighboring higher and lower addresses are also recalled dependent upon the length of the interpolating array. If the filter is of length two the addressed value and the subsequent value are accessed.

The fractional portion of the address is used to access a set of prestored interpolating filters or to support the generation of an interpolating filter. In the case of a filter of length two, simple averaging is generally utilized.

$I_i = a \cdot f$;

where a represents the integer part and f the mantissa or fractional component of $I_i$, and where the numbers of digits in a, f are chosen in accordance with the bit numbers available for each.

The following two element vector is accessed:

[a, a+1];

A two element filter is generated;

$$\begin{bmatrix} 1 - 0.f \\ 0.f \end{bmatrix}$$

$$[a, a+1]\begin{bmatrix} 1 - 0.f \\ 0.f \end{bmatrix} = D_i$$

where $D_i$ is the ith component of the warped data array D, corresponding to the captured array C.

From equation (3) above, it is seen that for each sample $T_i$ of the transmitted signal, a corresponding sampling time $I_i$ of the reflected signal S can be calculated as a function of the position of the object O, the sampling rate R and the frequency $\omega_1$ of the motion of the receiver. In other words, for each portion of the object, a new sampling time is calculated from equation (3). A band pass filter set at the base frequency $\omega$ is then used to filter the warped array D to obtain the amplitude of the reflected ultrasound signal from such portion of the body. The same process is then repeated for all body portions of interest to compile a complete image of the portions.

While equation (3) above illustrates how a different sampling time for the signal S may be determined for the simple case where the receiver is constrained to move along a straight line where its distance from the origin is sinusoidal, it will be readily evident to those skilled in the art that similar equations may be derived simply where the receiver motion is non-linear and more complicated than the case above.

The process of warping will now be explained qualitatively by reference to FIGS. 11–14. The data in these figures was generated based on a single stationary transmitter and a moving receiver. The receiver is moving in a circular path 4cm in diameter at 8,000 revs/sec. The reflecting object is located 10 cm from the transducer face at 4 cm off of the transducer axis 162. The speed of sound is assumed to be 1,540 meters/sec. As shown in FIG. 11, where the receiver was moving towards the object, the signal received by the receiver as reflected by the object will exhibit higher frequency than the base frequency of the transmitted signal. Where the receiver is moving away from the object, the frequency of the reflected signal will fall below the base frequency. The warping process has the effect of increasing the number of samples for reflected signals with frequencies above the base frequency so that such samples are closer together in time, whereas the samples sampling the reflected signal whose frequency falls below the base frequency are more spread out in time and fewer in number. The result is illustrated in FIG. 12. As shown in FIGS. 11, 12, regions 302 mark the time periods during which the receiver is moving towards the object resulting in higher reflected instantaneous frequency. Regions 304 mark the time periods during which the receiver is moving away from the object resulting in lower reflected instantaneous frequency. In FIGS. 12, 13, dark horizontal line 310 is the warped return from object 30 and is a constant frequency signal. Line 312 is the unwarped return from object 30 (FIG. 12), or the instantaneous frequency of return from object 30 as captured by receiver 152 in FIG. 11. FIG. 13 illustrates the effect of returns (reflected signals) from voxels away from object or portion 30. As shown in FIG. 13, after the return from object or portion 30 is warped by the warping array uniquely designed to remove the Doppler shift as seen by portion 30, the warped return from portion 30 results in constant frequency signal 310 at the base frequency. However, in the warping process for the return from object 30, the returns from all other portions are warped as well, resulting in warped returns surrounding the base frequency such as signals 320, 322. The warped return from a voxel adjacent to object or portion 30 is shown as 320, the warped return from a voxel distant from object or portion 30 is shown as 322. As the distance between the imaged object and other voxels increases, so does the frequency diversity separating the warped return from the imaged object and the returns from such other voxels. In FIG. 14, the filter returns a value reflecting the energy component of all illuminated voxels within the passband of the filter. Energy at frequencies outside the passband 330 are attenuated by the filter. As the filter length increases, the passband of the filter can be narrowed. For a filter of infinite length, the passband compresses around the base frequency returning the full energy of the imaged voxel while rejecting all other returns. For practical filters of finite length, some component of the neighboring pixel energy will be passed through the filter resulting in a degradation of the spatial response of the system. The optimum system trades off processing time, and imaging time against the spatial response required.

Where $I_i$ is calculated in equation (3) to be a number between i and i+1, the ith component of the warped data array D from the object O at distance x from the transmitter is given by a certain weighted average of the ith sample $C_i$ and the i+1 sample $C_{i+1}$. If $I_2$ is 2.2, then the second component of the dewarped data array from object O is given by 0.8 $C_2$+0.2 $C_3$. This, of course, is one way of interpolation: many other ways of interpolating are possible and are within the scope of the invention.

The above-described process may be repeated for all values of i from 1 to n, where n is the number of samples in the captured data array. Thus, a number of one-dimensional short filters will be applied successively to at least some of the elements of the n samples of the captured data array C arranged in array ($C_1$, $C_2$, . . . $C_n$). This set of one-dimensional filters may be combined into a two-dimensional filter W as shown below:

$$W = \begin{bmatrix} w_{11} w_{12} w_{13} & \ldots & w_{1n} \\ w_{21} w_{22} & \ldots & w_{2n} \\ w_{31} w_{32} & \ldots & w_{3n} \\ w_{n1} & \ldots & w_{nn} \end{bmatrix}$$

where $W_{ij}$= 0.f of $I_j$ for i=a of $I_j$ and $w_{ij}$=1−0.f of $I_j$ for i=a+1 of $I_j$ and $w_{ij}$= 0 elsewhere.

Where all n samples of data array C are used, this two-dimensional filter W is of size nxn; but if only m (smaller than n) samples are used, then the filter W is of size nxm. It will be noted that for each voxel imaged, a warping filter W is determined and applied. The warped data array D is arranged as ($D_1$, $D_2$, . . . $D_m$), where m is less than or equal to n as explained below.

Matched Filtering

The preferred embodiment utilizes a set of precalculated matched filters to generate image data from captured data in replacement of the dual warping, bandpass function. By utilizing a set of precalculated filters, a considerable portion of the real-time processing load can be off loaded and performed prior to data capture, thus reserving a greater proportion of signal analysis bandwidth available for real-time image generation in an imaging session.

The captured data is a vector array, C, of length n. The length is equivalent to the number of samples captured.

$C=[c_1\ c_2\ \ldots\ c_n\ ]$

In the basic embodiment without matched filtering, a warping filter is applied. As seen above, this filter is a two-dimensional filter W of size nxm, returning a warped array D of size m where m is the size of the succeeding band pass filter. In practice, the warping filter W is largely populated with zeros and to minimize processing time, the application of the filter is broken up into two phases. The first is an address generation phase dependent on the calculation of the imaging geometry given the location of the voxel being imaged. The output of this phase is an address into the captured array C with a fractional address component. Based on the fractional address component, one of several pre-stored one-dimensional short interpolating filters is applied to the set of points surrounding the base address. This filter estimates the fractional address value of C by averaging the surrounding sample values in a predetermined manner.

The application of the warping filter W to the captured data C generates the warped data D.

$$[c_1\ c_2\ \ldots\ c_n] \begin{bmatrix} w_{11} & w_{12} & \ldots & w_{1m} \\ w_{21} & w_{22} & \ldots & w_{2m} \\ \cdot & \cdot & & \cdot \\ \cdot & \cdot & & \cdot \\ \cdot & \cdot & & \cdot \\ w_{n1} & w_{n2} & \ldots & w_{nm} \end{bmatrix} = [d_1\ d_2\ \ldots\ d_m]$$

A filter F is applied to the warped data D generating a single result R representing the reflected energy from the target voxel. The filter can be generally represented as a single or set of one-dimensional vectors. The length of the filter need not be the length of the data, shorter filters will possess improved real-time response where longer filters will possess improved resolution and/or signal to noise ratios.

$$[d_1\ d_2\ \ldots\ d_m] \begin{bmatrix} f_1 \\ f_2 \\ \cdot \\ \cdot \\ f_m \end{bmatrix} = R$$

In the embodiment using matched filtering, the order of filter application is reversed. As opposed to applying the warping filter for imaging a portion of the body to the captured data initially, the warping filter is first applied to the bandpass filter F to generate a matched (matched to the portion of the body to be imaged) filter M.

$$\begin{bmatrix} w_{11} & w_{12} & \ldots & w_{1m} \\ w_{21} & w_{22} & \ldots & w_{2m} \\ \cdot & \cdot & & \cdot \\ \cdot & \cdot & & \cdot \\ \cdot & \cdot & & \cdot \\ w_{n1} & w_{n2} & \ldots & w_{nm} \end{bmatrix} \begin{bmatrix} f_1 \\ f_2 \\ \cdot \\ \cdot \\ f_m \end{bmatrix} = \begin{bmatrix} m_1 \\ m_2 \\ \cdot \\ \cdot \\ m_n \end{bmatrix} \quad W*F=M$$

This step is applied prior to the start of data gathering based on the imaging geometry and imaging region desired. A matched filter is stored for each voxel within the imaging region. In real time, the matched filters, M, are then applied sequentially to the captured data C to generate output values R.

$$[c_1 c_2 \ldots c_n] \begin{bmatrix} m_1 \\ m_2 \\ \cdot \\ \cdot \\ \cdot \\ m_n \end{bmatrix} = R$$

The two implementations are equivalent.

| Basic Embodiment | Matched Filtering Embodiment |
|---|---|
| C * W * F = R | C * W * F = R |
| where D is calculated | where M is calculated |
| as an intermediate | as an intermediate |
| value | value |
| C * W = D | W * F = M |

The generation of the matched filter M was shown using a filter F that was represented by a single linear vector. This process can be extended to more complex filters "F" by individuals skilled in the art.

Processor Data Flow—Basic Implementation (FIGS. 15, 16)

a. Operator. The operator is external to the invention and ultimately controls the operation of the system. He/she accomplishes this through interaction with the device and by setting both data gathering control parameters and imaging control parameters. The interface provided the operator to guide him in the control of these parameters may vary from application to application. The operator utilizes the operator controls 140 (FIG. 2) to interface with the system.

b. Data Gathering Control Parameters. These parameters are set by the operator and drive the data gathering control function. These parameters are abstract parameters set in the context that the operator is used to operating. As an example, the operator might set the required imaging function, length of the exam, the region to be imaged, and the resolution required. The data gathering control parameters are maintained in the central processing unit 106.

c. Imaging Control Parameters. These control parameters define the performance of the system once the data is gathered. Although data may be gathered to support full three-dimensional viewing of a volume, the operator may only wish to initially view certain two-dimensional slices of the volume, and can set real-time imaging performance parameters, etc., using these values. The imaging region must be a subset of the data gathering region. Real-time performance and imaging resolution parameters interact with each other and jointly determine the filter length parameter used in the imaging operation. The data gathering control parameters are maintained in the central processing unit 106.

d. Transmitter. The transmitter receives a continuous wave analog signal from transducer control. This signal is used to drive a simple acoustic transmitter which emits acoustic waves into the body. Additionally, depending on embodiment, either the transmitter or the receiver will be moving. If the transmitter (and/or receiver) is moving, then a set of speed control signals is received from the transducer control function which control the speed of transducer movement. The path of transmitter (and/or receiver) movement is controlled by the construction of the transducer. The transmitter and receiver are parts of the Transducer.

e. Transducer Control. This function is built in hardware and is controlled by a simple microcontroller. It provides control signals to the transducers driving motor speed for the transmitter and/or receiver, and a modulated (depending on the embodiment) analog signal to drive the transmitter. It also provides basic power and on/off control of the transducer.

f. Transducer Parameters. Resident in the central processing unit 106 and passed under CPU control to the transducer control card 114. These parameters include transmitter and/or receiver velocity information (depending on the embodiment), transmitter frequency and modulation information (depending on the embodiment), and basic on/off information.

g. Data Gathering Control. This function is resident in the central processing unit 106. It accepts input from the operator via the data gathering control parameters, and converts the top-level abstract control parameters into detailed transducer parameters and imaging geometry information. Using a basic table lookup control method, the data gathering control function determines the velocity of transmitter and/or receiver movement (depending on the embodiment), the transmitted frequency, and any modulation signal parameters (depending on the embodiment), the transmitted frequency, and any modulation signal parameters (depending on embodiment). It also provides basic timing control indicating when to start and stop imaging. It also provides the transducer parameter information in the form of imaging geometry information to the warper function.

h. Body. The body is external to the proposed embodiment of the invention. It is the object being imaged. An acoustic signal is radiated into the body from the transmitter. Reflected energy from interfaces within the body possessing differing acoustic impedances is collected by the receiver.

i. Receiver. The receiver captures reflected sonic energy from the body and converts the energy into an analog electrical signal. This signal is passed to the capture data function. Additionally, depending on embodiment, either the transmitter or the receiver will be moving. If the receiver is moving, then a set of speed control signals is received from the transducer control function which control the speed of receiver movement. The path of receiver movement is controlled by the construction of the transducer. Depending on the embodiment, the system may use one or more receivers to capture the reflected acoustic wave. Additional receivers are used to increase the rate of data gathering and thus improve the real-time performance of the system. The receiver is part of the transducer 102.

j. Capture Data 112. This function is resident in custom hardware. This board captures the analog signal(s) from the receiver and converts the data to digital form using standard analog to digital converters. The sampling rate is set based on base frequency, modulation signal, and potential Doppler effect. The sampling rate is set to satisfy Nyquist sampling limits. In some embodiments, a lowpass filter may be used on the incoming data from the receiver prior to digitization to limit the bandwidth of the signal.

k. Imaging Geometry. Resident in the central processing unit 106 and utilized in the generation of interpolation filters and address information by the warper function. The imaging geometry parameters define the conditions under which the data was gathered including transmitter speed, transmitter path, frequency, receiver speed, number of receivers, receiver path, initial conditions, and basic timing information.

l. Captured Data. Temporarily resident on the capture data board 112, this data is ultimately transferred to disk 108 for archival storage and transferred to the warper function resident on the signal analysis 110 board for further processing. The disposition of this data is under the control of central processing unit 106. This data represents in digital form the acoustic energy captured by the receiver (i.). The archive of the captured data in combination with the imaging geometry information can be utilized to generate image data in real-time or in non-real-time after archive. The archiving of this data insures that no data from the original scan is lost after completion of the imaging exercise.

m. Warper. The warper is passed voxel locations from the "For all Imaged Locations" function. For each location or voxel to be imaged, the warper generates a filter which expands and contracts the time scale as appropriate by oversampling or undersampling the captured data to remove the Doppler shift induced by transducer movement. The warping function removes the Doppler shift for the single-imaged point or voxel only. An interpolation filter is used to generate intermediate values when fractional addresses are generated into the captured data. The warping and bandpass filtering function comprise the processing intensive functions within the system driving system performance. The control of this function is accomplished within the central processing unit 106. The filtering process itself is performed within the signal analysis card 110.

n. For all Imaged Locations. This function iteratively steps through the image space, generating voxel addresses for all voxels to be imaged. The imaging region is defined by the operator through the imaging control parameters. The imaging region must be a subset of the data gathering region. Not all voxels within the data gathering region must be imaged. It is anticipated that in many cases, only a small fraction of the data gathering region will be analyzed and converted to an image at any one time. If the data is insufficient during the first analysis pass, the operator will always have the ability to recall the capture data from disk and generate a more complete imaged set at a later time. This function is resident on the central processing unit 106.

o. Bandpass Filter. This function is resident on the signal analysis board 110 and is performed under control of the central processing unit 106. The filter operates on the warped data stream and produces a single output representing the strength of the reflected acoustic signal from the voxel passed to the warper for each data stream operated upon. The length of the filter, and thus the quality of the filter, can be varied to optimize the performance of the system. A longer filter will produce some combination of higher contrast ratio and/or higher spatial resolution. The real-time performance of the system and its ability to image moving objects is degraded as the length of the filters increases. The number and speed of voxels which can be analyzed in any given time span is directly related to the length of filter being applied for any given hardware configuration. Thus, one may first use data collected in the first 10 seconds and a short filter to compute a crude image in real time, and then later use data collected in a longer time period and a longer filter for a higher resolution image. The Discrete Fourier Transform of the signal taken at a specific frequency is an example of an appropriate filter which will return the energy of the reflected acoustic signal as warped to the specific frequency.

p. Image Store. Image data produced by the bandpass filter is ultimately transferred to disk 108 for archival storage and either the network interface card 134 or the video display card 116 for output and viewing by the operator. The disposition of this data is under central processing unit control 106 and is controlled by the "For all Displayed Locations" function (q). This data provides a map of the body representing the acoustic reflectivity of each point within the imaged space. This data can be used to analyze the properties and construction of the body acoustically. The data can be analyzed in real-time utilizing the video display or other output device. Utilizing the archived version of the data, the operator can easily recall any set of previously generated image data for further analysis.

q. For all displayed locations. This function is resident on the central processing unit 106 and controls the real-time display or output of image data. This function controls what locations within the image data are displayed.

r. Network Interface 134. This function provides an interface from the system to external output, storage or analysis devices. Image data (P) and captured data (l) in combination with its defining image geometry (k) can be passed over this interface. Only image data can be printed in a form readable by the operator. This function is supported by a commercially available network interface card or function. Sometimes this function is incorporated into the central processing unit.

s. Video Display 118. This function provides for the real-time viewing of image data (P). This function is supported by the commercially available computer.

t. Printer 138. This function provides for the generation of hard copy images for immediate viewing, delayed viewing, or archival purposes.

u. Other Network Function 136. This system can be connected to other network systems over a local area network providing additional archival storage or additional viewing capabilities.

v. Display 118. Commercially available monitor for the viewing of image data in real-time.

w. Video Cassette Recorder 120. Commercially available device for the archival of a real-time imaging session.

x. Disk Storage 108. Standard disk storage internal to system and supporting short term archival storage of raw and processed data. Additional storage devices may be accessed through the network interface for this purpose.

y. Generate Matched Filters. (FIGS. 16A, 16B) Performed under central processing unit 106 control on the signal analysis board 110 and stored prior to image generation. Generation of matched filters is based upon the imaging geometry, the length of filter desired, and upon the voxel location. A unique matched filter is generated for each imaged voxel.

z. (FIGS. 16A, 16B) The matched filters are generated in the signal analysis board 110 under the control of CPU 106 prior to imaging and stored by the CPU 106.

aa. (FIGS. 16A, 16B) Image Generation. The matched filters (Z) are successively applied to the captured data (1) to generate a voxel amplitude representing the strength of the acoustic return.

FIGS. 15A, 15B are a processing data flow diagrams to illustrate one embodiment of the invention. As explained above, it is possible to first apply a warping filter to dewarp the signals detected by the receiver to obtain a modified data array of samples, and then apply a bandpass filter to recover the amplitudes of reflected signals from a voxel. FIGS. 15A, 15B illustrate the processing data flow for such implementation. The construction of bandpass filters are known to those skilled in the art and will not be elaborated here. The amplitudes of the reflected signals at different voxels indicated by the bandpass filter output are then stored for display at all or selected voxel locations by display 118 of FIG. 2. Their images can also be recorded by video cassette recorder 120 or printed by printer 138 of FIG. 2. As shown in FIGS. 15A, 15B the operator sets data gathering control parameters for operating the transducer and data capture, such as the size of voxels, and also sets imaging control parameters for specifying voxel locations for data warping and display. The data gathering control parameters would specify whether the transmitter alone, receiver alone, or both the transmitter and receiver are to be moved, along with control signals for controlling their moving speeds.

FIGS. 16A, 16B are is a data flow diagrams to illustrate the preferred embodiment where, instead of applying a warping filter to the data array to obtain a dewarped data array and then performing bandpass filtering, a number of matched filters are precalculated in the manner explained above so that during the imaging session, the system of FIGS. 1 and 2 would merely need to apply the matched filters to the array of data samples. As explained above, there will be one matched filter for each voxel location and all the matched filters for all the voxel locations may be precalculated and stored in disk storage prior to the imaging session.

As to Capture Data card 112, the process described above in reference to block j in FIGS. 15A, 15B and 16A, 16B can be further improved as follows. In the preferred embodiment shown in FIG. 17, the incoming signal is mixed with a base band signal to convert the signal to base band In-phase (I) and Quadrature (Q) components. The bandwidth of these components reflects the combined effect of frequency modulation and the resultant Doppler effect. Performing the base band conversion prior to digitization reduces the sampling rate and memory requirements of the system while maintaining the information content contained in the In-phase and Quadrature components. Subsequent filtering steps can be applied to the real In-phase component or both the In-phase and Quadrature components. Base band conversion and subsequent bandpass filtering of In-phase and Quadrature components can be easily accomplished by individuals skilled in the art.

Filter Design

While a bandpass filter F in the form of a linear array is illustrated in the description above, it will be understood that other filter designs such as multiple arrays and others may be used as well and are within the scope of the invention. One particular design is illustrated by reference to FIGS. 18, 19. A Discrete Fourier Transform (DFT) or similar transform can be utilized in the signal analysis board 110 to indicate the energy spectral density of the warped signal D represented as d[i], l=1, ..., n, in the neighborhood of the base band frequency. The following equation can be used to generate the filter response R of the system corresponding to the energy components of the signals d[i], l=1, ..., n, within a frequency band centered at the base band frequency of the transmitted signal for the object O within the warped array d[i].

$$R = \left| \sum_{i=0}^{N-1} d[i]e^{-j2\pi k i} \right|^2 \quad (4)$$

N=length of d[n].

k=(transmission frequency/sampling frequency) for a signal warped to the transmission frequency k=0 for a signal converted to base band I & Q components prior to digitization and warped to remove the induced Doppler effect.

In other words, the response R above includes the full reflected energy from the target object in the central spectral band 340, as well as some of the reflected energy from neighboring voxels adjacent to the target object. In the preferred embodiment, the DFT of side spectral bands 342 surrounding the central band are subtracted from the response R to decrease the contribution of neighboring pixels to the response so that the full reflected energy from the target in the central band may be determined (see FIG. 18). The DFT of a point object centered at $O_{x,y,z}$ returns the full energy in the central band and zero energy in the neighboring spectral bands. The energy of neighboring objects is more evenly spread over the central and side spectral bands. By subtracting components of the side spectral bands, the spatial response of the DFT filter can be improved by taking advantage of the relatively smooth spread of neighboring pixel energy to minimize the contribution of the neighboring pixels to the result R as shown below:

$$R = \left| \sum_{i=0}^{N-1} d[i]e^{-j2\pi k i} \right|^2 - \sum_{l=0}^{l<(k \cdot f_s)} a_l \left| \sum_{i=0}^{N-1} d[i]e^{-j2\pi l i/f_s} \right|^2 - \sum_{l>(k \cdot f_s)}^{l=f_s/2} a_l \left| \sum_{i=0}^{N-1} d[i]e^{-j2\pi l i/f_s} \right|^2 \quad (5)$$

Where $f_s$ = sampling frequency

The coefficients $a_l$ are determined uniquely for each voxel location within the image and designed to minimize the side lobes of the filter response. FIG. 18 illustrates the energy returned in side or neighboring passbands 342 as well as the energy returned in a central passband 340. The full energy returned from the target object 30 is contained within this central band. A proportional amount of energy from neighboring voxels also contributes to this value. The target object does not contribute to the energy returned by the neighboring or side passbands shown in FIG. 18. A proportional amount of energy from neighboring voxels contributes to the return in neighboring passbands.

FIG. 19 shows the improvement possible in filter response by subtraction of the side spectral frequency bands. To calculate the data represented in FIG. 19, a low frequency signal was mixed with the warped data with the effect of broadening the spatial response and smoothing the side lobes. This technique and others to improve the response of bandpass filters to specific signal types can be readily implemented by those skilled in the art in board 110 under the control of CPU 106.

FIG. 19 illustrates the improvement in spatial response that can be obtained by subtracting the response of neighboring spectral bands from the response R so as to determine the central spectral band result caused solely by the target object. The filter was designed to provide the amplitude of the return from a point located 4 cm off axis and 10 cm from the transducer. The real components of equations (4) and (5) were used to calculate the results shown above. The following values of a were used in equation (5).

$$a_1=1, a_2=2.2, a_3=0.35, a_4-a_n=0$$

Note the smoothing of the side lobes and the substantial improvement in the attenuation of distant pixel returns using equation (5). Signal 350 in FIG. 19 is the spatial response at the Central Band including the returns from the target object as well as neighboring voxels. After the voxel response in the neighboring spectral bands are subtracted from response 350, the improved attenuated result is shown as signal 352 in FIG. 19.

Conditions of Data Capture in FIG. 19

The data shown in FIG. 19 was obtained by simulation under the following conditions. Transmitter is stationary, with single receiver moving at 1,000 revolutions/second around an ellipse with major and minor axis of 6 cm and 2 cm, respectively. The axis of the ellipse is rotating at 100 revolutions per second. The warper was focused on a point 10 cm from the transducer and 4 cm off axis. A 5 Hz signal was mixed with the dewarped result with the effect of smoothing the side lobes at the expense of some broadening of the main lobe. The transmitter emitted a 2 MHz signal modulated by a 750 KHz signal.

From the above, it will be seen that the objectives of the invention have been achieved. The transmitter transmits a continuous wave ultrasound signal for at least a time period. By moving the transmitter and/or receiver continuously relative to a body or object to be imaged during such time period, a continuously time varying Doppler phase shift is created. Thus, the transmitted signal is continuous for at least a time period during which the transmitter and/or receiver is or are moving. By utilizing the information concerning the Doppler phase shift within this time period, and by warping and filtering the reflected signal detected, the amplitudes of the reflected signals from different portions of a three-dimensional object can be determined and displayed as an image. The resolution of the system is not limited by the wavelength of the ultrasound and very simple transducer systems can be used for imaging three-dimensional objects in real time.

The above-described system is flexible and versatile. Thus, a small number of samples can first be analyzed using a short filter to determine whether the region imaged is indeed the one desired, and this can be done in real time. After it is determined that the region imaged is correct, more samples can be analyzed by using longer filters to yield higher solution images for a preliminary imaging and analysis during the imaging session. Since the samples are stored in memory buffers, such samples can be retrieved at a later time after the imaging session for high resolution and more detailed analysis of particular portions of the region. For example, if a black spot is detected in an image of a patient's body, only the voxels surrounding such black spot can be selected and the samples for the selected voxels analyzed and displayed at high resolution after the imaging session to display in great detail the region of interest. This invention enables the transducer portion of the system to be very simple at a moderate increase in complexity of data processing. The invention has been described above by reference to different embodiments. It will be understood that various modifications and changes may be made. For example, while the different embodiments employ acoustic signals such as ultrasound or sound signals, it will be understood that the same system can be used for imaging using signals other than acoustic, such as radar. All such variations are within the scope of the invention. The scope of the invention is to be limited only by the appended claims.

What is claimed is:

1. An acoustic system for imaging a region, comprising:
   a transmitter transmitting an acoustic signal towards the region, said region reflecting said acoustic signal to generate a modified acoustic signal;
   a receiver providing an output signal in response to said modified acoustic signal;
   a device moving the transmitter or the receiver substantially continuously relative to the body to cause a Doppler phase shift of the receiver output signal relative to the transmitted signal, said transmitted signal being continuous for at least a time period during which said device is moving the transmitter or receiver; and
   means for determining, from the Doppler phase shift between the transmitted signal during said at least one time period and the receiver output signal, the amplitudes of signals reflected from different portions of the region in order to provide an image of the region.

2. The system of claim 1, said determining means including means for filtering the modified signal to obtain the amplitude of the transmitted signal that is reflected from at least one portion of said region.

3. The system of claim 2, said filtering means including:
   means for sampling the receiver output signal to provide a sequence of sampled signal values at a predetermined sampling rate; and
   means for modifying said sequence of sampled signal values in order to remove effects of the Doppler phase shift from the sequence for said at least one portion, and for obtaining from the modified sequence the amplitude of the transmitted signal that is reflected from said at least one portion of said region.

4. The system of claim 3, said modifying and obtaining means including:
   warping means for expanding time durations between consecutive sampled values that correspond to energy of the receiver output signal at frequencies above those of the transmitted signal and contracting time durations between consecutive sampled values that correspond to energy of the receiver output signal at frequencies below those of the transmitted signal to derive said modified sequence in order to remove effects of the Doppler phase shift; and
   means for filtering the modified sequence to obtain the amplitude of the transmitted signal that is reflected from said at least one portion of said region.

5. The system of claim 4, said warping means including means for deriving modified sampling rates for sampled values in the sequence.

6. The system of claim 4, said warping means including an interpolation filter to derive said modified sequence.

7. The system of claim 4, said filtering means including a band pass filter.

8. The system of claim 3, said modifying and obtaining means including a plurality of matched filters, each matched filter corresponding to a portion of said region and each matched filter deriving from said sequence the amplitude of the transmitted signal that is reflected from the corresponding portion of the region.

9. The system of claim 1, further comprising one or more additional receivers providing an output signal in response to said modified acoustic signal.

10. The system of claim 1, said region being three dimensional, wherein said device moves the transmitter or receiver along a non-linear path so that said determining means provides a three dimensional image of the region.

11. The system of claim 10, wherein said path is substantially on a flat plane.

12. The system of claim 11, said path being substantially a circle.

13. The system of claim 11, said path being substantially an ellipse.

14. The system of claim 1, wherein said device moves both the transmitter and receiver.

15. The system of claim 10, said device including means for changing said path to alter the periodicity of said path.

16. The system of claim 1, said device including:

a transducer disk; and a motor rotating the disk about an axis, said transmitter or receiver connected to the disk at a location away from the axis.

17. The system of claim 16, further comprising two or more receivers connected to the disk at a location away from the axis.

18. The system of claim 16, said disk having a slot therein, said device further comprising:

a plate with a continuous slot on its surface; and a pin attached to the transmitter or receiver, said pin engaging the slots in the disk and the surface of the plate, so that when said motor rotates the disk, the pin is constrained to move in the slots, thereby defining a path for the transmitter or receiver.

19. The system of claim 16, said disk having a slot therein, said device moving said plate, so that motions of the plate and the disk define the path.

20. The system of claim 19, said device including means for adjusting the motion of the plate or disk, or of both, so as to alter the periodicity of the path.

21. The system of claim 1, wherein the transmitter modulates the acoustic signal transmitted to change its periodicity.

22. The system of claim 21, wherein the transmitter modulates the acoustic signal transmitted by modulating its frequency in order to change its periodicity.

23. The system of claim 1, said determining means including means for converting said the receiver output signal to a converted signal substantially in baseband of the transmitted signal.

24. The system of claim 1, said determining means including:

means for generating a central spectral signal indicating energy spectral density of the receiver output in a central spectral band of the transmitted signal for one portion of said region and at least one side spectral signal indicating energy spectral density of the receiver output in a side spectral band of the transmitted signal for another portion of the region adjacent to said one portion; and means for subtracting the at least one side spectral signal from said central spectral signal.

25. The system of claim 24, said generating means including means for performing Discrete Fourier Transforms.

26. A method for imaging a region, comprising the following steps:

transmitting from a transmitting location an acoustic signal towards the region, said region reflecting said acoustic signal to generate a modified acoustic signal;

receiving at a receiving location said modified acoustic signal and providing an output signal in response to said modified acoustic signal;

moving the transmitting or the receiving location substantially continuously relative to the body to cause a Doppler phase shift of the output signal relative to the transmitted signal, said transmitted signal being continuous for at least a time period during which said location is moved; and determining, from the Doppler phase shift between the transmitted signal during said at least one time period and the output signal, the amplitudes of signals reflected from different portions of the region in order to provide an image of the region.

27. The method of claim 26, said determining step including filtering the modified signal to obtain the amplitude of the transmitted signal that is reflected from at least one portion of said region.

28. The method of claim 27, said filtering including the steps of:

sampling the output signal to provide a sequence of sampled signal values at a predetermined sampling rate; and modifying said sequence of sampled signal values in order to remove effects of the Doppler phase shift from the sequence for said at least one portion, and for obtaining from the modified sequence the amplitude of the transmitted signal that is reflected from said at least one portion of said region.

29. The method of claim 28, said modifying and obtaining step including:

expanding time durations between consecutive sampled values that correspond to energy of the output signal at frequencies above those of the transmitted signal and contracting time durations between consecutive sampled values that correspond to energy of the output signal at frequencies below those of the transmitted signal to derive said modified sequence in order to remove effects of the Doppler phase shift; and filtering the modified sequence to obtain the amplitude of the transmitted signal that is reflected from said at least one portion of said region.

30. The method of claim 29, said expanding and contracting step including deriving modified sampling rates for sampled values in the sequence.

31. The method of claim 29, said expanding and contracting step including an interpolation step that derives at least one value in said modified sequence from two or more values in the sequence.

32. The method of claim 29, said filtering step including band pass filtering.

33. The method of claim 28, said modifying and obtaining step including a step of determining, for each portion of the region, a corresponding matched filter, the matched filters having coefficients so that the effect of each matched filter is to expand time durations between consecutive sampled values that correspond to energy of the output signal at frequencies above those of the transmitted signal and to contract time durations between consecutive sampled values that correspond to energy of the output signal at frequencies below those of the transmitted signal to remove effects of the Doppler phase shift, and to simultaneously filter the sequence to obtain the amplitude of the transmitted signal that is reflected from said at least one portion of said region.

34. The method of claim 28, said method further comprising storing the sequence of sampled signal values.

35. The method of claim 34, said modifying step being performed at a predetermined resolution, said method further comprising repeating said modifying and obtaining step for the stored sequence of sampled signal values at a resolution different from said predetermined resolution.

36. The method of claim 34, further including a step of selecting a first group of values from said sequence, said modifying and obtaining step modifying said first group of values in order to remove effects of the Doppler phase shift from the first group for a plurality of portions of the region, and obtaining from the modified group the amplitudes of the transmitted signal that is reflected from said plurality of portions of said region.

37. The method of claim 36, wherein said selecting step selects a group of values that correspond to a selected group of voxels in the region, or that are received in the receiving step during a selected time duration.

38. The method of claim 37, further comprising:

selecting a second group of values in the stored sequence different from said first selected group of values; and repeating said modifying and obtaining step for the second group of values.

39. The method of claim 26, further comprising receiving at at least one additional receiving location said modified acoustic signal and providing at least one additional output signal in response to said modified acoustic signal, to accelerate data acquisition.

40. The method of claim 26, said region being three dimensional, wherein said moving step moves the transmitting or receiving location along a non-linear path so that said determining step provides a three dimensional image of the region.

41. The method of claim 40, wherein said moving step moves the transmitting or receiving location along a path substantially on a flat plane.

42. The method of claim 41, wherein said moving step moves the transmitting or receiving location along a substantially circular path.

43. The method of claim 41, wherein said moving step moves the transmitting or receiving location along a substantially elliptical path.

44. The method of claim 40, said moving step including changing said path to alter the periodicity of said path.

45. The method of claim 26, said moving step including:

connecting a transmitter or receiver to a disk at a location; and rotating a transducer disk about an axis, where the location is away from the axis.

46. The method of claim 45, said connecting step comprising connecting two or more receivers to the disk at locations away from the axis.

47. The method of claim 45, said disk having a slot therein, said moving step employing a plate with a continuous slot on its surface; and a pin attached to the transmitter or receiver, said pin engaging the slots in the disk and the surface of the plate, so that when said motor rotates the disk, the pin is constrained to move in the slots, thereby defining a path for the transmitter or receiver, said moving step moving said plate, as well as the disk, so that motions of the plate and the disk define the path.

48. The method of claim 47, said moving step including adjusting the motion of the plate or disk, or of both, so as to alter the periodicity of the path.

49. The method of claim 26, further comprising modulating the acoustic signal transmitted to change its periodicity.

50. The method of claim 49, wherein the modulating step modulates the acoustic signal transmitted by modulating its frequency in order to change its periodicity.

51. The method of claim 26, wherein said moving step moves both the transmitter and receiver.

52. The method of claim 26, said determining step including converting said output signal to a converted signal substantially in the baseband of the transmitted signal.

53. The method of claim 26, said determining step including:

generating a central spectral signal indicating energy spectral density of the output signal in a central spectral band of the transmitted signal for one portion of said region and at least one side spectral signal indicating energy spectral density of the output signal in a side spectral band of the transmitted signal for another portion of the region adjacent to said one portion; and subtracting the at least one side spectral signal from said central spectral signal.

54. The method of claim 53, said generating step including performing Discrete Fourier Transforms.

55. A system for imaging a region, comprising:

a transmitter transmitting a signal towards the region, said region reflecting said signal to generate a modified signal;

a receiver providing an output signal in response to said modified signal;

a device moving the transmitter or the receiver substantially continuously relative to the body to cause a Doppler phase shift of the receiver output signal relative to the transmitted signal, said transmitted signal being continuous for at least a time period during which said device is moving the transmitter or receiver; and means for determining, using information regarding the Doppler phase shift, the amplitudes of signals reflected from different portions of the region in order to provide an image of the region.

56. A method for imaging a region, comprising the following steps:

transmitting from a transmitting location an signal towards the region, said region reflecting said acoustic signal to generate a modified signal;

receiving at a receiving location said modified signal and providing an output signal in response to said modified signal;

moving the transmitting or the receiving location substantially continuously relative to the body to cause a Doppler phase shift of the output signal relative to the transmitted signal, said transmitted signal being continuous for at least a time period during which said location is moved; and determining, using information regarding the Doppler phase shift, the amplitudes of signals reflected from different portions of the region in order to provide an image of the region.

* * * * *